(12) United States Patent
Yanai

(10) Patent No.: US 8,964,068 B2
(45) Date of Patent: *Feb. 24, 2015

(54) IMAGE SENSING APPARATUS, CONTROL METHOD THEREOF, AND STORAGE MEDIUM

(71) Applicant: Canon Kabushiki Kaisha, Tokyo (JP)

(72) Inventor: Toshikazu Yanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,768

(22) Filed: Feb. 4, 2014

(65) Prior Publication Data

US 2014/0184855 A1    Jul. 3, 2014

Related U.S. Application Data

(63) Continuation of application No. 12/545,805, filed on Aug. 21, 2009, now Pat. No. 8,687,093.

(30) Foreign Application Priority Data

Sep. 1, 2008    (JP) .................................. 2008-223916

(51) Int. Cl.
*H04N 5/262* (2006.01)
*H04N 5/232* (2006.01)
*G06T 3/40* (2006.01)

(52) U.S. Cl.
CPC .......... *H04N 5/23296* (2013.01); *G06T 3/4023* (2013.01)
USPC ................................... 348/240.2; 348/240.99

(58) Field of Classification Search
None
See application file for complete search history.

(56) References Cited

U.S. PATENT DOCUMENTS

| 6,876,386 | B1 | 4/2005 | Ito |
| 6,947,082 | B2 | 9/2005 | Gomi |
| 7,257,278 | B2 | 8/2007 | Burks et al. |
| 7,679,657 | B2 | 3/2010 | Morita |
| 7,733,389 | B2 | 6/2010 | Kurosawa et al. |
| 2006/0221213 | A1* | 10/2006 | Watanabe et al. .......... 348/240.3 |
| 2007/0188632 | A1 | 8/2007 | Kobayashi |
| 2007/0257996 | A1 | 11/2007 | Kurosawa et al. |

FOREIGN PATENT DOCUMENTS

| JP | 2000-295530 | 10/2000 |
| JP | 2002-330329 | 11/2002 |

(Continued)

OTHER PUBLICATIONS

Japanese Office Action dated Dec. 7, 2012 concerning Japanese Application No. 2008-223916.

*Primary Examiner* — Twyler Haskins
*Assistant Examiner* — Angel L Garces-Rivera
(74) *Attorney, Agent, or Firm* — Fitzpatrick, Cella, Harper & Scinto

(57) ABSTRACT

An apparatus having an electronic zoom function, comprising an image sensing element, a zoom magnification setting unit, a pixel signal readout unit, an image processor, and a controller which, when the zoom magnification is between first and second zoom magnifications, controls to read out pixel signals of a first pixel count, and to generate the image using pixel signals of a second pixel count, and when the zoom magnification is between third and fourth zoom magnifications, controls to read out pixel signals of a third pixel count, and to generate the image using pixel signals of a fourth pixel count, the second pixel count is not larger than the first pixel count, the fourth pixel count is not larger than the third pixel count.

4 Claims, 11 Drawing Sheets

(56) References Cited

FOREIGN PATENT DOCUMENTS

| JP | 2005-191867 | 7/2005 |
| JP | 2007-124542 | 5/2007 |
| JP | 2007-221273 | 8/2007 |
| JP | 2007-295129 A | 11/2007 |
| JP | 2007-329685 A | 12/2007 |

* cited by examiner

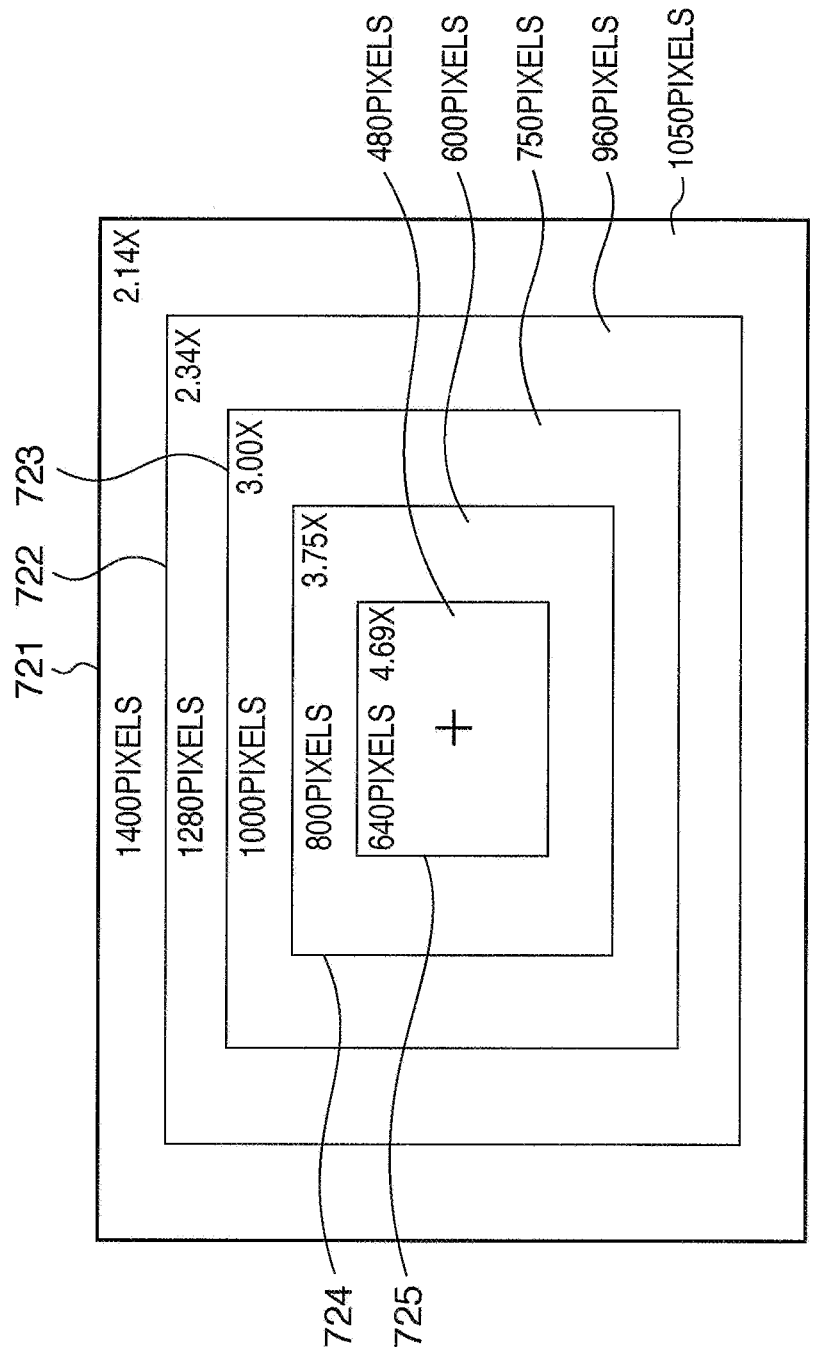

IMAGE SENSING APPARATUS, CONTROL METHOD THEREOF, AND STORAGE MEDIUM

This application is a continuation of U.S. application Ser. No. 12/545,805, filed Aug. 21, 2009 (allowed), the contents of which are incorporated by reference herein.

BACKGROUND OF THE INVENTION

1. Field of the Invention

The present invention relates to an image sensing apparatus, control method thereof, and storage medium, particularly an electronic zoom technique of reducing the degradation of resolution.

2. Description of the Related Art

Recent advanced image sensing elements have significantly developed image input devices including an electronic still camera and video camera. In particular, electronic still cameras and video cameras with a movie function have been proposed. A camera of this type has an electronic zoom function of extracting only signals of a desired range from image signals read out from an image sensing element, and enlarging the image of the extracted signal to zoom electronically.

The electronic zoom function is designed to make the readout pixel count almost equal to the output pixel count for display and recording at the widest angle of view. As the camera zooms in, the readout pixel count runs short compared to the output pixel count, degrading the resolution. As solutions to this, the following methods have been proposed.

The first method provides an electronic zoom which hardly degrades the resolution. According to this method, signals are always read out from all the pixels (e.g., 1,280×960) of a region corresponding to the widest angle of view. For a telephoto angle of view, some of the readout signals are extracted and directly read out (e.g., 640×480 for a 2× zoom). For a wide angle of view, signals are output by reducing the pixel count by conversion (in this case, reduction conversion from 1,280×960 to 640×480).

However, the first method needs to always read out signals from all the pixels (1,280×960), decreasing the display frame rate (to 1/4 of the frame rate to read out signals from 640×480 pixels).

The second method is an electronic zoom method which makes the readout pixel count almost equal to the output pixel count for display and recording, reducing the degradation of resolution, like Japanese Patent Laid-Open No. 2000-295530. According to this method, for example, when a 2× zoom function is activated, signals are read out from all the 640×480 pixels of an extracted region for a telephoto angle of view. For a wide angle of view, signals are read out from 640×480 pixels out of the entire 1,280×960 region while thinning them at a thinning rate of 1/2 vertically and horizontally. The entire 1,280×960 region is used to, for example, shoot a still image.

However, the second method can take only discrete magnifications capable of thinning readout. When the electronic zoom is used, images can only be shot at discrete magnifications.

The third method is an electronic zoom method of gradually changing the thinning rate of image signals output from an image sensing element, instead of simple thinning, in order to attain an intermediate magnification, like Japanese Patent Laid-Open No. 2005-191867. This method reads out image signals from n pixels out of m pixels (m≥n; m and n are natural numbers) at a thinning rate n/m. Changing n/m implements an intermediate magnification.

The third method can provide an intermediate magnification by gradually changing the thinning rate of image signals. However, this method needs to always read out signals from all the pixels and suffers a low display frame rate, similar to the first method.

In view of this, Japanese Patent Laid-Open No. 2002-330329 proposes the fourth method. According to this method, images of the predetermined size necessary for display are read out from a region D and larger region E at a thinning rate d and higher thinning rate e. For an intermediate region between the regions D and E, an image is read out from the region E at the thinning rate d, and converted into the predetermined image size necessary for display using the image size of the intermediate region out of the readout image. As a result, an electronic zoom at an intermediate magnification is achieved. Note that thinning to 1/e is expressed as a thinning rate e in Japanese Patent Laid-Open No. 2002-330329, and will be defined as a thinning rate of 1/e in this specification.

The fourth method attains an electronic zoom by reading out an image from the region D at the thinning rate d, and even for an intermediate region between the regions D and E, reading out an image from the region E at the thinning rate d. In this case, the readout image size (pixel count) of the region E becomes the square of e/d of the readout image size (pixel count) of the region D. The readout time of the region E also becomes the square of e/d of the readout time of the region D, and limits the frame rate in movie shooting.

For example, when the predetermined image size necessary for display is 10×10 pixels, an image is read out from a 10×10 pixel region at a thinning rate of 1, and read out from a 20×20 pixel region at a thinning rate of 2. In an intermediate region between the 10×10 pixel region and the 20×20 pixel region, an image is read out from the 20×20 pixel region at a thinning rate of 1. The readout pixel count becomes the square of 2/1, that is, quadruples.

The readout time is unbalanced between readout of the region E and that of the region D. When the electronic zoom is executed, the readout time of a shot image differs between regions.

For example, the readout timing of the first pixel (1st pixel) in the 10×10 pixel region and that of the first pixel (1st pixel) in the 20×20 pixel region differ from each other by a time corresponding to readout of 300 pixels. The readout timing of the final pixel (100th pixel) in the 10×10 pixel region and that of the final pixel (400th pixel) in the 20×20 pixel region differ from each other by a time corresponding to readout of 300 pixels.

Japanese Patent Laid-Open No. 2002-330329 describes a technique of reading out an image from a region corresponding to a desired intermediate magnification by changing the readout method of pixels from an image sensing element while implementing an image size necessary for display at the intermediate magnification by the same method as the third one.

However, control becomes complicated if the readout method of the image sensing element is changed at every intermediate magnification of the electronic zoom.

SUMMARY OF THE INVENTION

In order to solve the aforementioned problems, the present invention in its first aspect provides an image sensing apparatus having an electronic zoom function, comprising: an image sensing element in which a plurality of pixels are arrayed in a horizontal direction and a vertical direction; a setting unit configured to set a zoom magnification of the electronic zoom; a readout unit configured to read out a pixel signal from the image sensing element; an image processing unit configured to generate an image of a predetermined pixel count using the pixel signal; and a control unit configured to, when the zoom magnification set by the setting unit is between a first zoom magnification and a second zoom magnification higher than the first zoom magnification, control the readout unit to read out pixel signals of a first pixel count from a first readout region of the image sensing element at a first thinning rate, and the image processing unit to generate the image of the predetermined pixel count using pixel signals of a second pixel count corresponding to a zoom magnification contained in the pixel signals of the first pixel count, and when the zoom magnification set by the setting unit is between a third zoom magnification higher than the second zoom magnification and a fourth zoom magnification higher than the third zoom magnification, control the readout unit to read out pixel signals of a third pixel count from a second readout region of the image sensing element that is smaller than the first readout region at a second thinning rate lower than the first thinning rate, and the image processing unit to generate the image of the predetermined pixel count using pixel signals of a fourth pixel count corresponding to a zoom magnification contained in the pixel signals of the third pixel count, wherein the second pixel count is not larger than the first pixel count, the fourth pixel count is not larger than the third pixel count, and the predetermined pixel count is smaller than the first pixel count and the third pixel count and is not larger than the second pixel count and the fourth pixel count.

The present invention in its second aspect provides a control method of an image sensing apparatus having an image sensing element in which a plurality of pixels are arrayed in a horizontal direction and a vertical direction, the method comprising: a setting step of setting a zoom magnification of an electronic zoom; a readout step of reading out a pixel signal from the image sensing element; and an image processing step of generating an image of a predetermined pixel count using the pixel signal, wherein when the zoom magnification set in the setting step is between a first zoom magnification and a second zoom magnification higher than the first zoom magnification, control is performed to read out pixel signals of a first pixel count from a first readout region of the image sensing element at a first thinning rate in the readout step, and generate the image of the predetermined pixel count in the image processing step using pixel signals of a second pixel count corresponding to a zoom magnification contained in the pixel signals of the first pixel count, and when the zoom magnification set in the setting step is between a third zoom magnification higher than the second zoom magnification and a fourth zoom magnification higher than the third zoom magnification, control is performed to read out pixel signals of a third pixel count from a second readout region of the image sensing element that is smaller than the first readout region at a second thinning rate lower than the first thinning rate in the readout step, and generate the image of the predetermined pixel count in the image processing step using pixel signals of a fourth pixel count corresponding to a zoom magnification contained in the pixel signals of the third pixel count.

The present invention in its third aspect provides a computer-readable storage medium storing computer executable instructions which, when run on a computer, cause the computer to execute a method of controlling an image sensing apparatus having an image sensing element in which a plurality of pixels are arrayed in a horizontal direction and a vertical direction, the method comprising: a setting step of setting a zoom magnification of an electronic zoom; a readout step of reading out a pixel signal from the image sensing element; and an image processing step of generating an image of a predetermined pixel count using the pixel signal, wherein when the zoom magnification set in the setting step is between a first zoom magnification and a second zoom magnification higher than the first zoom magnification, control is performed to read out pixel signals of a first pixel count from a first readout region of the image sensing element at a first thinning rate in the readout step, and generate the image of the predetermined pixel count in the image processing step using pixel signals of a second pixel count corresponding to a zoom magnification contained in the pixel signals of the first pixel count, and when the zoom magnification set in the setting step is between a third zoom magnification higher than the second zoom magnification and a fourth zoom magnification higher than the third zoom magnification, control is performed to read out pixel signals of a third pixel count from a second readout region of the image sensing element that is smaller than the first readout region at a second thinning rate lower than the first thinning rate in the readout step, and generate the image of the predetermined pixel count in the image processing step using pixel signals of a fourth pixel count corresponding to a zoom magnification contained in the pixel signals of the third pixel count.

According to the present invention, an electronic zoom technique of smoothly operating the electronic zoom without greatly degrading the resolution or complicating control can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a view exemplifying an image read out from pixels corresponding to a 2.14× angle of view in FIG. 10 one by one in the horizontal and vertical directions.

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

[First Embodiment]

The first embodiment will now be explained.

An image sensing apparatus according to the present invention is implemented by an electronic still camera or video camera with a movie function, and includes a megapixel image sensing element, an image display unit capable of displaying an image sensed by the image sensing element, and an image recording unit capable of recording the image. The image sensing apparatus is premised on that a pixel count used to display and record a movie is smaller than that used to record a still image.

Figure 1:
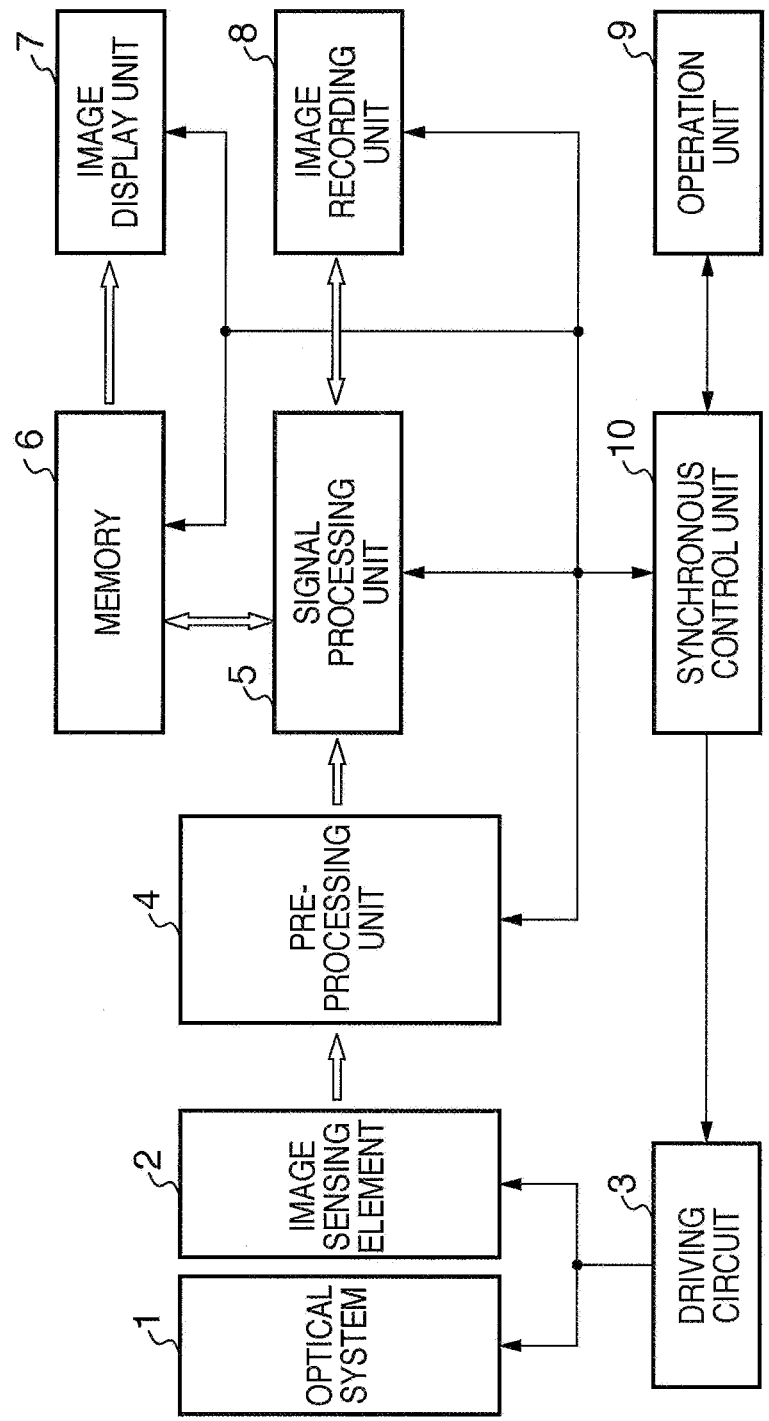
FIG. 1 is a block diagram showing the arrangement of an image sensing apparatus according to an embodiment of the present invention.

FIG. 1 is a block diagram showing the arrangement of the image sensing apparatus according to the first embodiment.

Referring to FIG. 1, the image sensing apparatus of the embodiment includes an optical system 1, an image sensing element 2, a driving circuit 3, a pre-processing unit 4, a signal processing unit 5, a memory 6 for storing image data, an image display unit 7, an image recording unit 8, an operation unit 9, and a synchronous control unit 10.

The optical system 1 includes a focusing lens for forming an object image on the image sensing element 2, a zoom lens for optically zooming, a stop for adjusting the brightness of an object image, and a shutter for controlling exposure. The driving circuit 3 drives these components.

The image sensing element 2 includes a plurality of pixels arrayed in a matrix, and a circuit for outputting signals read out from these pixels in a predetermined order. Details of the image sensing element 2 will be described later with reference to FIG. 3.

In response to a control signal from the synchronous control unit 10, the driving circuit 3 drives the optical system 1 and image sensing element 2 by supplying a constant voltage and a pulse which enhances driving performance. The driving circuit 3 also has a function of transmitting a control signal from the synchronous control unit 10 to the image sensing element 2.

The pre-processing unit 4 is controlled by a control signal from the synchronous control unit 10. The pre-processing unit 4 includes a correlated double sampling circuit (CDS circuit) for removing a noise component such as reset noise from an analog signal output from the image sensing element 2. The pre-processing unit 4 further includes a gain control amplifier for adjusting the amplitude of a noise-free signal, and an A/D converter for converting an amplitude-adjusted analog signal into a digital signal.

The signal processing unit 5 is controlled by a control signal from the synchronous control unit 10. The signal processing unit 5 performs appropriate signal processing for an output signal which has been converted into a digital signal and sent from the pre-processing unit 4, and converts the processed signal into image data. The signal processing unit 5 outputs image data and an output signal converted into a digital signal to the memory 6 and image recording unit 8. The signal processing unit 5 executes signal processing upon receiving image data and an output signal converted into a digital signal from the memory 6 and image recording unit 8. The signal processing unit 5 also has a function of detecting photometric data such as a focusing state and exposure from a signal output from the image sensing element 2, and sending the data to the synchronous control unit 10.

The memory 6 is controlled by a control signal from the synchronous control unit 10. The memory 6 temporarily stores a signal which has been output from the image sensing element 2 and converted into a digital signal, and image data having undergone signal processing. The memory 6 also has a function of outputting display image data to the image display unit 7.

The image display unit 7 is controlled by a control signal from the synchronous control unit 10. The image display unit 7 displays display image data to be stored in the memory 6, in order to allow the user to decide the composition before shooting or confirm a shot image. The image display unit 7 is formed from an electronic viewfinder (EVF) and liquid crystal display (LCD). In general, the image display unit 7 has a display pixel count smaller than the vertical pixel count of the image sensing element 2. In the embodiment, the display pixel count of the image display unit 7 is smaller than the output pixel count of the image sensing element 2.

The image recording unit 8 includes a detachable memory and the like, and is controlled by a control signal from the synchronous control unit 10. The image recording unit 8 can record image data and an output signal which has been converted into a digital signal and sent from the signal processing unit 5, and read image data from the detachable memory.

The operation unit 9 notifies the synchronous control unit 10 of an external instruction using operation members such as a switch, push button, lever, and dial. Examples of the external instruction are the state of the power switch of the image sensing apparatus, that of the push button for designating shooting, that of the button or lever for designating the optical zoom or electronic zoom, and that of the mode dial for selecting a shooting mode. The operation unit 9 notifies the synchronous control unit 10 of an image display instruction before shooting, various shooting instructions, and a menu operation to designate display of a shot image or the operation of the image sensing apparatus in advance. In response to a control signal from the synchronous control unit 10, the operation unit 9 can display the state of the image sensing apparatus on a display (e.g., an LCD or LED) or the image display unit 7. It is also possible to use the image display unit 7 as a display and a touch panel attached to the image display unit 7 as an operation member, and perform an on-screen operation.

The synchronous control unit 10 controls the overall image sensing apparatus based on an instruction input from the operation unit 9. The synchronous control unit 10 controls the optical system 1 to form an optimum object image on the image sensing element 2 in accordance with photometric data such as a focusing state and exposure sent from the signal processing unit 5. The synchronous control unit 10 can detect the use status of the memory 6 and the attachment and use status of the memory of the image recording unit 8.

An example of converting a signal output from the pre-processing unit 4 into image data will be explained with reference to FIG. 2.

Figure 2:
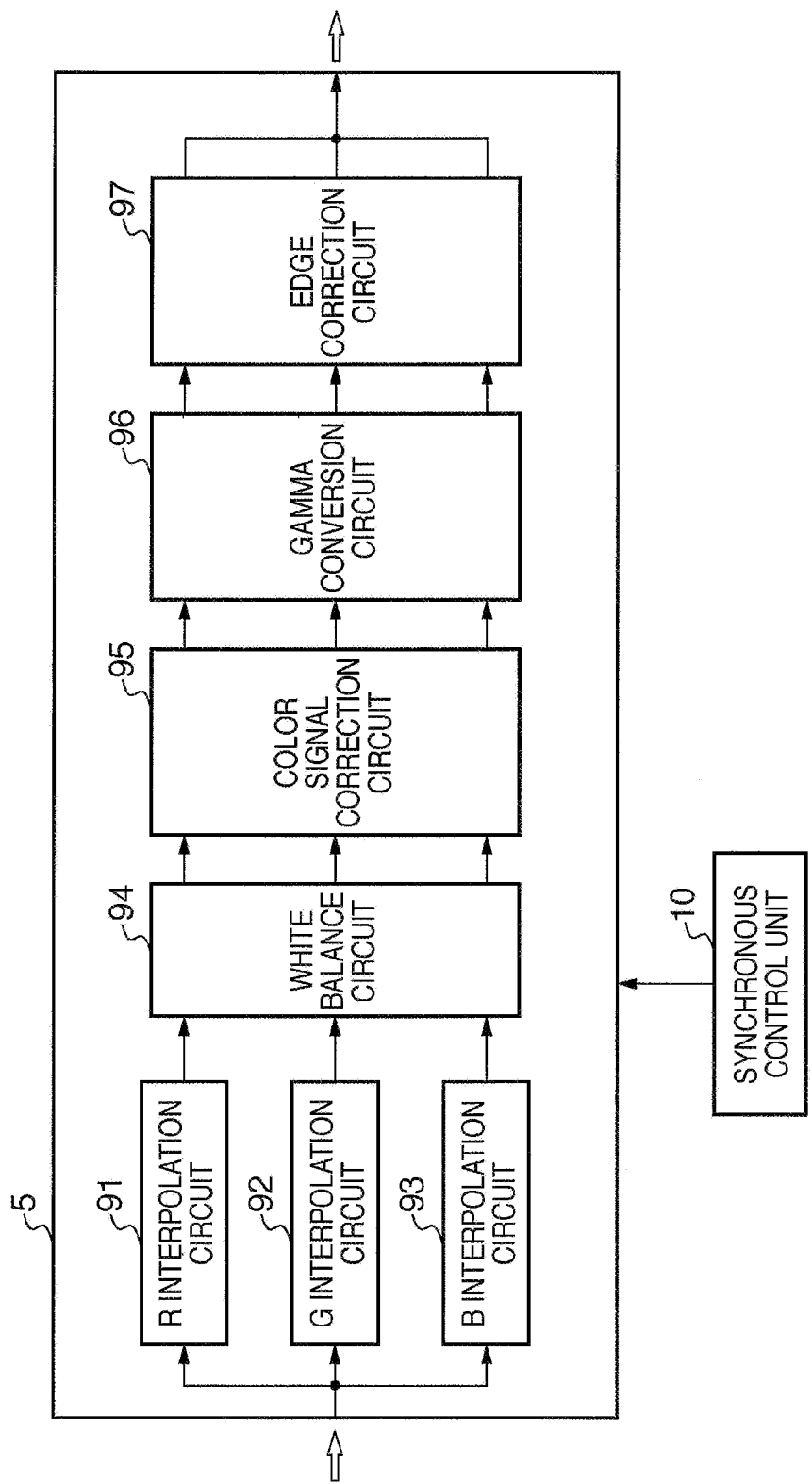
FIG. 2 is a block diagram showing the detailed arrangement of a signal processing unit in FIG. 1.

FIG. 2 is a block diagram exemplifying details of the signal processing unit 5 in FIG. 1.

Referring to FIG. 2, the signal processing unit 5 includes an R interpolation circuit 91, G interpolation circuit 92, B interpolation circuit 93, white balance circuit 94, color signal correction circuit 95, gamma conversion circuit 96, and edge correction circuit 97.

Under the control of the synchronous control unit 10, the signal processing unit 5 causes the R interpolation circuit 91, G interpolation circuit 92, and B interpolation circuit 93 to interpolate R, G, and B signals input from the pre-processing unit 4 and generate R, G, and B signals which are absent at corresponding pixel positions. For the R, G, and B signals, the signal processing unit 5 causes the white balance circuit 94 to execute white balance adjustment, and the color signal correction circuit 95 to execute color signal processing including color noise removal and removal of a false color such as moire. In addition, the signal processing unit 5 causes the gamma conversion circuit 96 to perform gamma conversion, and the edge correction circuit 97 to perform luminance signal processing including edge enhancement and aperture correction, thereby completing a color image. The signal processing unit 5 sends the complete color image to the memory 6 and image recording unit 8.

The R interpolation circuit 91, G interpolation circuit 92, and B interpolation circuit 93 may execute pixel count conversion corresponding to a still image, movie recording image, or display image. In an image sensing apparatus using the megapixel image sensing element 2, the capacity of color image (data amount of color image) increases. Thus, the signal processing unit 5 may include an image compression circuit to compress an image, output the compressed image to the image recording unit 8, and record it.

Next, the main operations of the image sensing apparatus according to the first embodiment will be explained.
<Control of Display Image>

(1) The power supply is turned on in response to an instruction from the power switch of the operation unit 9.

(2) The signal processing unit 5 converts an image signal from the image sensing element 2 into display image data, and displays the image data on the image display unit 7. In addition, the signal processing unit 5 detects photometric data and sends it to the synchronous control unit 10.

(3) The synchronous control unit 10 controls the optical system 1 based on the photometric data.

(4) (2) and (3) are repeated, and the process waits for an instruction from the operation unit 9.
<Control of Still Image Shooting>

(1) Control of still image shooting starts in response to an instruction from the shooting switch of the operation unit 9.

(2) The signal processing unit 5 detects photometric data from an image signal from the image sensing element 2, and sends it to the synchronous control unit 10.

(3) The synchronous control unit 10 controls the optical system 1 based on the photometric data.

(4) The image sensing element 2 undergoes exposure for still image recording, and outputs a signal.

(5) The signal processing unit 5 converts the image signal from the image sensing element 2 into recording image data, and sends the data to the image recording unit 8 to record it in a detachable memory. Also, the signal processing unit 5 converts the recording image data into display image data, and displays it on the image display unit 7.

(6) The process returns to (4) of <control of display image>.
<Control of Movie Shooting>

(1) Control of movie shooting starts in response to an instruction from the shooting switch of the operation unit 9.

(2) The signal processing unit 5 converts an image signal from the image sensing element 2 into recording image data, and sends the data to the image recording unit 8 to record it in a detachable memory. Also, the signal processing unit 5 converts the recording image data into display image data, and displays it on the image display unit 7.

(3) The signal processing unit 5 detects photometric data from the image signal from the image sensing element 2, and sends it to the synchronous control unit 10.

(4) The synchronous control unit 10 controls the optical system 1 based on the photometric data. The image sensing element 2 undergoes exposure for still image recording, and outputs a signal.

(5) (2) to (4) are repeated, and the process waits for an instruction from the operation unit 9.
<Control of Electronic Zoom>

(1) Control of the electronic zoom starts in response to an instruction from the zoom button or zoom lever of the operation unit 9 in (4) of <control of display image> or (5) of <control of movie shooting>.

(2) The synchronous control unit 10 decides an electronic zoom magnification, and switches driving of the image sensing element 2.

(3) The synchronous control unit 10 instructs the signal processing unit 5 on signal processing corresponding to the electronic zoom magnification.

(4) The process returns to (4) of <control of display image> or (5) of <control of movie shooting>.

The arrangement of the image sensing element 2 will be explained with reference to FIGS. 3 to 5.

Figure 3:
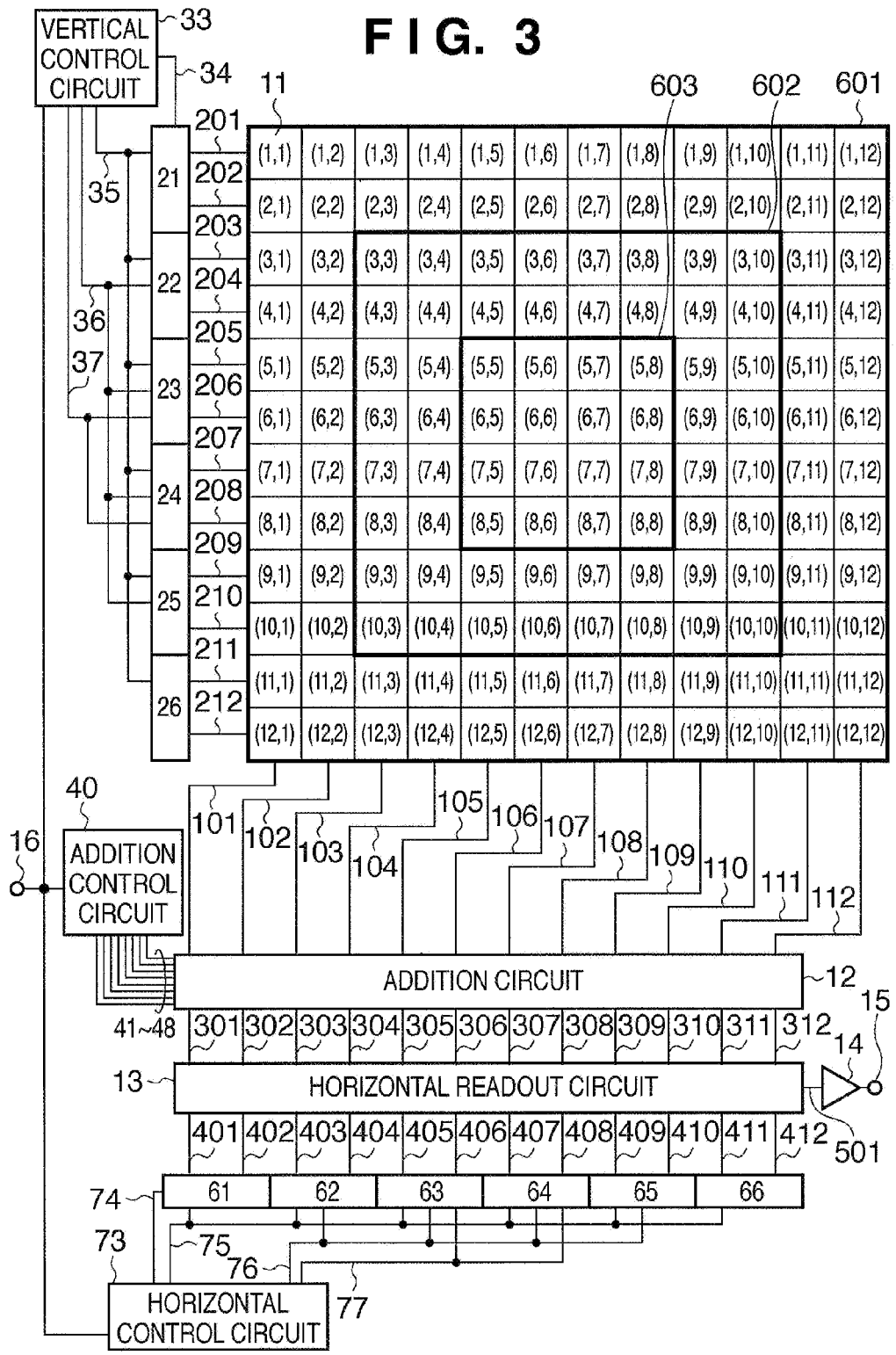
FIG. 3 is a block diagram showing the detailed arrangement of an image sensing element in FIG. 1.

In FIG. 3, the pixel count is 12 in both the horizontal and vertical directions for descriptive convenience. A pixel 11 converts incident light into an electrical signal, and (1,1) is an address representing the horizontal position (H) and vertical position (V) of this pixel. The remaining pixels have the same structure as that of the pixel 11 except that corresponding vertical address lines 201 to 212 and vertical signal lines 101 to 112 differs between the pixels. (H,V) is an address representing the position of each pixel.

Figure 4:
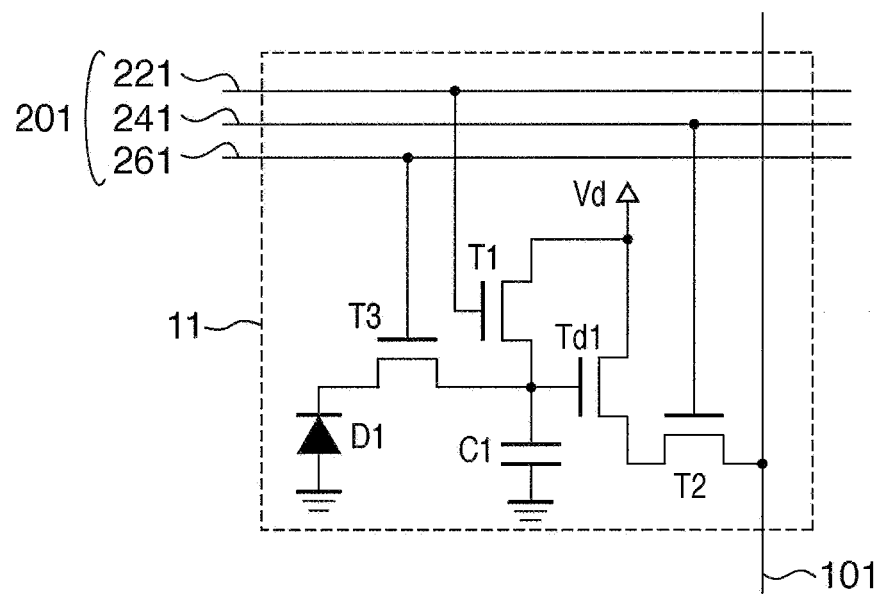
FIG. 4 is a circuit diagram showing the detailed structure of the pixel of the image sensing element.

FIG. 4 shows the detailed structure of the pixel 11. In FIG. 4, a portion surrounded by a dotted line is the pixel 11. The pixel 11 is connected to other circuits via the vertical address line 201 which is commonly connected to pixels on one horizontal row and can simultaneously control them, and the vertical signal line 101 which is commonly connected to pixels on one vertical column and outputs signals from them. The vertical address line 201 includes a reset control line 221, vertical address line 241, and transfer control line 261.

A photoelectric conversion element D1 converts light into charges. An FD capacitor C1 accumulates charges when converting charges of the photoelectric conversion element D1 into a voltage. A driving transistor Td1 for an amplifier in a pixel outputs a voltage corresponding to the voltage of the FD capacitor C1. A reset transistor T1 is connected to the reset control line 221 to reset the voltage of the FD capacitor C1. A selection transistor T2 is connected to the vertical address line 241 to output an output from the driving transistor Td1 as the output signal of the pixel to the vertical signal line 101. A transfer transistor T3 is connected to the transfer control line 261 to control transfer of charges from the photoelectric conversion element D1 to the FD capacitor C1. A power supply Vd is used for the driving transistor Td1 and reset transistor T1.

In the embodiment, transistors other than the driving transistor Td1 function as switches, and are turned on upon activating the control line connected to their gates and off upon inactivating it.

A pixel signal readout operation in the image sensing element 2 will be explained.

When reading out signals from pixels on one horizontal row of the image sensing element 2, the vertical address line 201 controls all the pixels on one horizontal row. The pixel (1,1) will be exemplified, but the remaining pixels operate similarly. While the transfer transistor T3 is OFF, the reset transistor T1 is turned on via the reset control line 221 to reset the voltage of the FD capacitor C1, and then turned off. The transfer transistor T3 is turned on via the transfer control line 261 to transfer charges from the photoelectric conversion element D1 to the FD capacitor C1. In the FD capacitor C1, the charges transferred from the photoelectric conversion element D1 are converted into a voltage as a pixel signal. After that, the selection transistor T2 is turned on via the vertical address line 241 to output the signal voltage of the FD capacitor C1 to the vertical signal line 101. This signal serves as a pixel signal, and this readout will be defined as pixel signal readout.

A first readout angle 601 of view is the full angle of view containing all 12×12 pixels (1,1) to (12,12) in the horizontal and vertical directions. A second readout angle 602 of view contains 8×8 pixels (3,3) to (10,10) in the horizontal and vertical directions out of the full angle of view. A third readout angle 603 of view contains 4×4 pixels (5,5) to (8,8) in the horizontal and vertical out of the full angle of view.

Six vertical shift registers 21 to 26 can select the vertical address lines 201 to 212 connected to readout pixels, and select the first readout angle 601 of view, second readout angle 602 of view, and third readout angle 603 of view.

A vertical control circuit 33 receives a control signal from the synchronous control unit 10 via a control input terminal 16 to control the vertical shift registers 21 to 26. A vertical shift register control line 34 can designate one of "select every row", "select every other row", and "select every third row" via the vertical address lines 201 to 212. Reference numerals 35 to 37 denote vertical register selection lines. The vertical register selection line 35 selects all the vertical shift registers 21 to 26 to select pixels corresponding to the first readout angle 601 of view serving as the full angle of view. The vertical register selection line 36 selects the vertical shift registers 22 to 25 to select pixels corresponding to the second readout angle 602 of view. The vertical register selection line 37 selects the vertical shift registers 23 and 24 to select pixels corresponding to the third readout angle 603 of view. The vertical register selection lines 35 to 37 can instruct selected vertical shift registers on one of "one-row readout operation", "two-row addition operation", and "three-row addition operation".

Assume that the vertical register selection lines 35 to 37 designate "one-row readout operation", and the vertical shift register control line 34 designates one of "select every row", "select every other row", and "select every third row". In this case, the vertical shift registers 21 to 26 can be controlled to "select every row", "select every other row", and "select every third row" via the vertical address lines 201 to 212 of a corresponding angle of view. Assume that the vertical register selection lines 35 to 37 designate "two-row addition operation", and the vertical shift register control line 34 designates "select every other row". In this case, the vertical shift registers 21 to 26 can be controlled to "simultaneously select two rows" via the vertical address lines 201 to 212 of a corresponding angle of view during the one-row readout operation. Then, the signals of two pixels in the vertical direction are averaged and output to the vertical address lines. Further, assume that the vertical register selection lines 35 to 37 designate "three-row addition operation", and the vertical shift register control line 34 designates "select every third row". In this case, the vertical shift registers 21 to 26 can be controlled to "simultaneously select three rows" via the vertical address lines of a corresponding angle of view during the one-row readout operation. Then, the signals of three pixels in the vertical direction are averaged and output to the vertical address lines.

An addition circuit 12 can add pixel signals sent to the vertical signal lines 101 to 112. An addition control circuit 40 controls the addition circuit 12 based on the instruction of a control signal from the synchronous control unit 10 via the control input terminal 16. Addition control lines 41 to 48 control the addition circuit 12.

A horizontal readout circuit 13 is controlled by horizontal address lines 401 to 412 to output, to an output circuit 14, signals sent via addition output lines 301 to 312 of the addition circuit 12. The output circuit 14 includes a current amplifier circuit and voltage amplifier circuit. The output circuit 14 amplifies a signal output from the horizontal readout circuit 13 to an appropriate current or voltage, and outputs the amplified signal to the pre-processing unit 4 via an output terminal 15. A horizontal readout control line 501 controls the horizontal readout circuit 13.

Six horizontal shift registers 61 to 66 can select the horizontal address lines 401 to 412, and select the first readout angle 601 of view, second readout angle 602 of view, and third readout angle 603 of view.

A horizontal control circuit 73 controls the horizontal shift registers 61 to 66 in response to a control signal from the synchronous control unit 10 via the control input terminal 16. A horizontal shift register control line 74 can designate one of "select every column", "select every other column", and "select every third column" via the horizontal address lines. Reference numerals 75 to 77 denote horizontal register selection lines. The horizontal register selection line 75 selects all the horizontal shift registers 61 to 66 to select pixels corresponding to the first readout angle 601 of view serving as the full angle of view. The horizontal register selection line 76 selects the horizontal shift registers 62 to 65 to select pixels corresponding to the second readout angle 602 of view. The horizontal register selection line 77 selects the horizontal shift registers 63 and 64 to select pixels corresponding to the third readout angle 603 of view.

Assume that the horizontal shift register control line 74 designates one of "select every column", "select every other column", and "select every third column". In this case, the horizontal shift registers 61 to 66 can be controlled to "select every column", "select every other column", and "select every third column" via the horizontal address lines of a corresponding angle of view.

Figure 5:
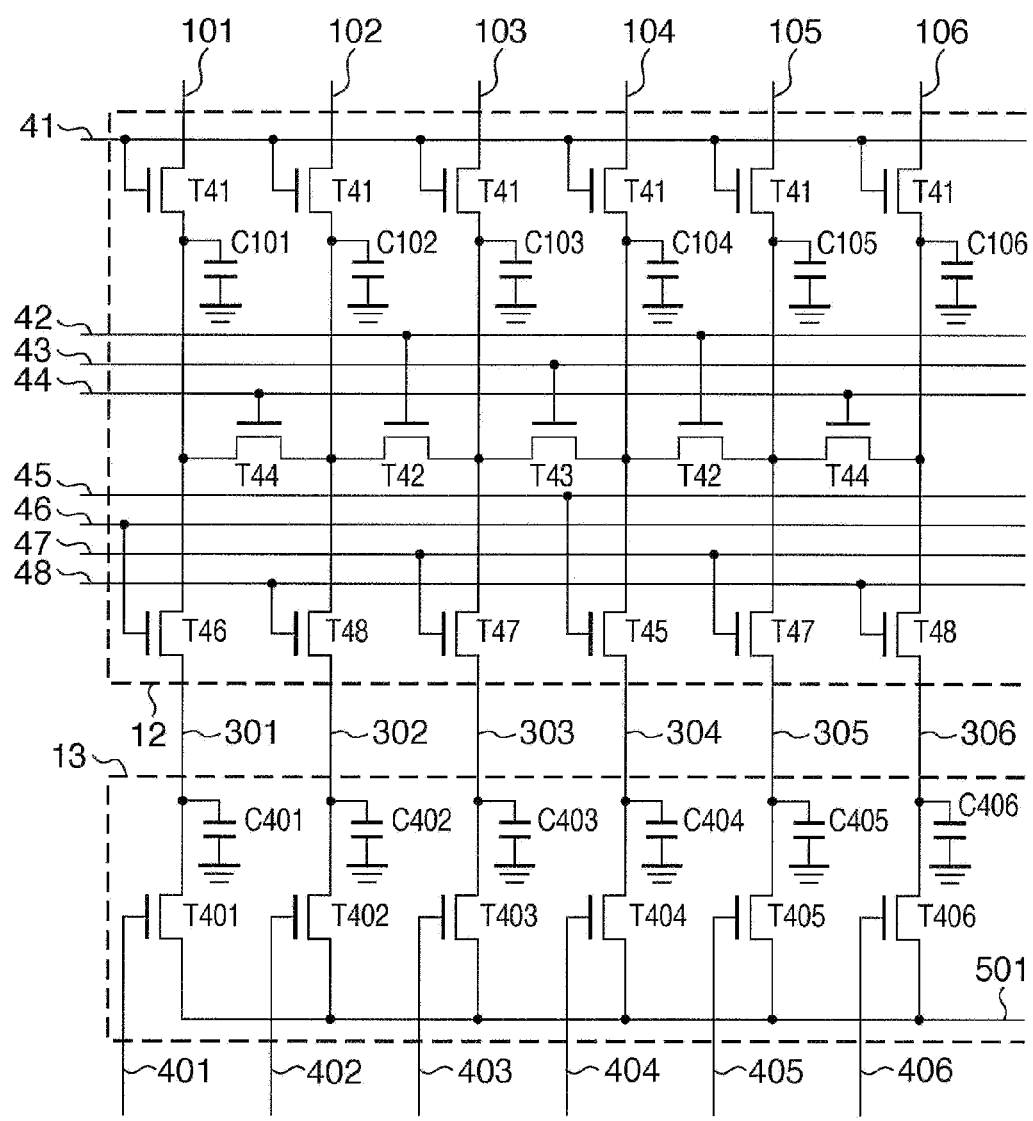
FIG. 5 is a circuit diagram showing the detailed arrangements of an addition circuit and horizontal readout circuit in FIG. 3.

FIG. 5 shows the detailed arrangements of the addition circuit 12 and horizontal readout circuit 13. Although only an arrangement corresponding to six pixels on the left in FIG. 3 will be explained with reference to FIG. 5, the same arrangement also applies to six pixels on the right.

Transistors T41 to T48 function as switches which are connected/disconnected by turning them on/off via addition control lines 41 to 48 of the same numbers as those of the transistors T41 to T48. Accumulation capacitors C101 to C106 (or C107 to C112 (not shown)) accumulate pixel signals sent to the vertical signal lines 101 to 106 (or vertical signal lines 107 to 112). Addition output lines 301 to 306 (or 307 to 312) transfer outputs from the addition circuit 12.

Accumulation capacitors C401 to C406 (or C407 to C412 (not shown)) accumulate signals sent via the addition output lines 301 to 306 (or 307 to 312). Transistors T401 to T406 (or T407 to T412 (not shown)) function as switches which are connected/disconnected by turning them on/off via the address lines 401 to 406 (or address lines 407 to 412 (not shown)) of the same numbers as those of the transistors T401 to T406. The transistors T401 to T406 (or T407 to T412 (not shown)) can output signals to the output circuit 14 via the horizontal readout control line 501.

The output circuit 14 is an amplifier having the horizontal readout control line 501 as an input. The output circuit 14 amplifies an input signal to a proper current or voltage, and outputs the amplified signal to the pre-processing unit 4 via the output terminal 15.

The operations of the addition circuit 12 and horizontal readout circuit 13 will be described with reference to FIG. 5.

Under the control of the addition control line 41, the transistors T41 are turned on to accumulate pixel signals sent to the vertical signal lines 101 to 106 in the accumulation capacitors C101 to C106, and then turned off.

If pixel signals are not added, the addition control lines 45 to 48 turn on the transistors T45 to T48. The signals in the accumulation capacitors C101 to C106 are output to the addition output lines 301 to 306, and accumulated in the corresponding accumulation capacitors C401 to C406 of the horizontal readout circuit 13. Thereafter, the transistors T45 to T48 are turned off.

In response to an instruction from the horizontal shift register control line 74 to start an operation to "select every column", the transistors T401 to T406 are sequentially turned on/off under the control of the horizontal address lines 401 to 406. The signals in the accumulation capacitors C401 to C406 are sequentially output to the output circuit 14 via the horizontal readout control line 501.

This operation is also executed for pixel signals sent to the vertical signal lines 107 to 112, sequentially outputting the pixel signals sent to the vertical signal lines 101 to 112.

When adding the signals of two pixels in the horizontal direction, the transistors T43 and T44 are turned on under the control of the addition control lines 43 and 44, and the transistors T46 and T47 are turned on under the control of the addition control lines 46 and 47. Averaged signals of every two signals from the accumulation capacitors C101 to C106 are output to the corresponding addition output lines 301, 303, and 305.

After the averaged signals are accumulated in the corresponding accumulation capacitors C401, C403, and C405, the transistor T43, T44, T46, and T47 are turned off.

In response to an instruction from the horizontal shift register control line 74 to start an operation to "select every other column", the transistors T401, T403, and T405 are turned on/off in order under the control of the horizontal address lines 401, 403, and 405. The signals in the accumulation capacitors C401, C403, and C405 are sequentially output to the output circuit 14 via the horizontal readout control line 501.

This operation is also performed for pixel signals sent to the vertical signal lines 107 to 112, sequentially outputting signals in the accumulation capacitors C407, C409, and C411 to the output circuit 14 via the horizontal readout control line 501. Accordingly, signals obtained by adding pixel signals sent to the vertical signal lines 101 to 112 for every two pixels in the horizontal direction can be output.

When adding the signals of three pixels in the horizontal direction, the transistors T42 and T44 are turned on under the control of the addition control lines 42 and 44, and the transistors T45 and T46 are turned on under the control of the addition control lines 45 and 46. Averaged signals of every three signals from the accumulation capacitors C101 to C106 are output to the corresponding addition output lines 301 and 304.

After the averaged signals are accumulated in the corresponding accumulation capacitors C401 and C404, the transistor T42, T44, T45, and T46 are turned off.

In response to an instruction from the horizontal shift register control line 74 to start an operation to "select every third column", the transistors T401 and T404 are turned on/off in order under the control of the horizontal address lines 401 and 404. The signals in the accumulation capacitors C401 and C404 are sequentially output to the output circuit 14 via the horizontal readout control line 501.

This operation is also performed for signals sent to the vertical signal lines 107 to 112, sequentially outputting signals in the accumulation capacitors C407 and C410 to the output circuit 14 via the horizontal readout control line 501. As a result, signals obtained by adding pixel signals sent to the vertical signal lines 101 to 112 for every three pixels in the horizontal direction can be output.

As the vertical addition operation and vertical address line selection method, "one-row readout operation" in "select every row", "one-row readout operation" in "select every other row", and "one-row readout operation" in "select every third row" have been described. Also, "two-row addition operation" in "successively select two rows", and "three-row addition operation" in "successively select three rows" have been explained. As the horizontal addition circuit operation selection method, three operations "horizontal addition-free operation", "two-pixel horizontal addition operation", and "three-pixel horizontal addition operation" have been explained. As the horizontal address line selection method, three operations "select every column", "select every other column", and "select third column" have been described. In addition to the operation of reading out signals pixel by pixel in the horizontal and vertical directions, a combination of the vertical address line selection method, horizontal addition circuit operation selection method, and horizontal address line selection method is also available.

For example, horizontal and vertical pixel thinning operations include 1/2 thinning in only the vertical direction, 1/3 thinning in only the vertical direction, 1/2 thinning in only the horizontal direction, 1/3 thinning in only the horizontal direction, 1/2 thinning in the horizontal and vertical directions, and 1/3 thinning in the horizontal and vertical directions. Further, the pixel thinning operations include a combination of 1/2 thinning in the horizontal direction and 1/3 thinning in the vertical direction, and a combination of 1/3 thinning in the horizontal direction and 1/2 thinning in the vertical direction. In other words, the thinning rate can be set to 1/n (n is a natural number) in each of the horizontal and vertical directions.

Horizontal and vertical pixel addition operations include addition of two pixels in only the vertical direction, addition of three pixels in only the vertical direction, addition of two pixels in only the horizontal direction, and addition of three pixels in only the horizontal direction. Also, the pixel addition operations include addition of 2×2=4 pixels in the horizontal and vertical directions, addition of 3×3=9 pixels in the horizontal and vertical directions, addition of 2×3=6 pixels in the horizontal and vertical directions, and addition of 3×2=6 pixels in the horizontal and vertical directions.

Selectable readout angles of view are three: the first readout angle 601 of view serving as the full angle of view, the second readout angle 602 of view, and the third readout angle 603 of view. For each angle of view, the foregoing pixel addition operations and pixel thinning operations can be implemented.

By expanding the circuits described with reference to FIGS. 3 to 5, the pixel addition counts and pixel thinning counts in the horizontal and vertical directions can be increased to four or more pixels, and the number of readout angles of view can also be increased to more than three.

Next, shooting modes in the image sensing apparatus of the embodiment will be described.

A still image shooting mode in which signals are read out pixel by pixel from the first readout angle 601 of view serving as the full angle of view will be explained. This mode corresponds to (4) of <control of still image shooting>.

In the still image shooting mode, signals are read out pixel by pixel in the horizontal and vertical directions from the first readout angle 601 of view serving as the full angle of view. For this purpose, the following selecting operations are performed.

(1) The vertical shift registers and horizontal shift registers select the first readout angle 601 of view serving as the full angle of view.

(2) The vertical shift registers select "one-row readout operation" in "select every row".

(3) The addition circuit 12 selects "horizontal addition-free operation".

(4) The horizontal shift registers select "select every row".

After exposure, the vertical shift register control line 34 designates "select every row" in the image sensing element 2. The vertical register selection line 35 is selected, and "one-row readout operation" is designated. In response to this, the first readout angle 601 of view serving as the full angle of view is selected, and the vertical address lines 201 to 212 are selected in order.

This operation selects the vertical address line 201 first to read out pixel signals from the first row of the image sensing element 2 and output them to the corresponding vertical signal lines 101 to 112.

In the still image shooting mode, no horizontal addition is done. The addition circuit 12 directly sends the pixel signals to the horizontal readout circuit 13 to accumulate them in the corresponding accumulation capacitors C401 to C412.

Then, the horizontal shift register control line 74 designates "select every column". The horizontal register selection line 75 is selected to select the first readout angle 601 of view serving as the full angle of view and select the horizontal address lines 401 to 412 in order.

This operation sequentially sends the signals in the accumulation capacitors C401 to C412 to the output circuit 14 via the horizontal readout control line 501, outputting them from the output terminal 15.

As a result, the pixel signals on the first row of the image sensing element 2 that are selected by the vertical address line 201 are output.

In the same way, pixel signals of the image sensing element 2 that are selected by the vertical address lines 202 to 212 can be output sequentially. The signals of all the pixels in the first readout angle 601 of view serving as the full angle of view can therefore be read out pixel by pixel.

A case in which the image sensing element 2 is driven to read out signals from three different angles of view in electronic zoom operation (2) of <control of electronic zoom> will be explained.

A mode in which signals are read out from the first readout angle 601 of view serving as the full angle of view at a thinning rate of 1/3 in both the horizontal and vertical directions will be defined as a thinning 1× zoom mode (from the first zoom magnification to the second zoom magnification). A mode in which signals are read out from the second readout angle 602 of view at a thinning rate of 1/2 in both the horizontal and vertical directions will be defined as a thinning 2× zoom mode (from the third zoom magnification to the fourth zoom magnification). A mode in which signals are read out pixel by pixel from the third readout angle 603 of view will be defined as a 3× zoom mode.

In the first embodiment, as will be described later, the third readout angle of view and the fourth readout angle of view smaller than the third one are set for the first readout angle 601 of view. The fifth readout angle of view and the sixth readout angle of view smaller than the fifth one are set for the second readout angle 602 of view.

In the thinning 1× zoom mode, signals are read out from the first readout angle 601 of view serving as the full angle of view at a thinning rate of 1/3 in both the horizontal and vertical directions. For this purpose, the following selecting operations are performed.

(1) The vertical shift registers and horizontal shift registers select the first readout angle 601 of view serving as the full angle of view.

(2) The vertical shift registers select "one-row readout operation" in "select every third row".

(3) The addition circuit 12 selects "horizontal addition-free operation".

(4) The horizontal shift registers select "select every third column".

In the image sensing element 2, the vertical shift register control line 34 designates "select every third row". The vertical register selection line 35 is selected, and "one-row readout operation" is designated. Then, the first readout angle 601 of view serving as the full angle of view is selected, and the vertical address lines 201, 204, 207, and 210 are selected in order.

This operation selects the vertical address line 201 first to read out pixel signals from the first row of the image sensing element 2 and output them to the corresponding vertical signal lines 101 to 112.

In the 1× zoom mode of the embodiment, no horizontal addition is done. The addition circuit 12 directly sends the pixel signals to the horizontal readout circuit 13 to accumulate them in the corresponding accumulation capacitors C401 to C412.

The horizontal shift register control line 74 designates "select every third column". The horizontal register selection line 75 is selected to select the first readout angle 601 of view serving as the full angle of view and select the horizontal address lines 401, 404, 407, and 410 in order.

This operation sequentially sends the signals in the accumulation capacitors C401, C404, C407, and C410 to the output circuit 14 via the horizontal readout control line 501, outputting them from the output terminal 15.

Accordingly, the pixel signals on the first row of the image sensing element 2 that are selected by the vertical address line 201 are output.

Similarly, pixel signals of the image sensing element 2 that are selected by the vertical address lines 204, 207, and 210 can be output sequentially. The signals of the pixels in the first readout angle 601 of view serving as the full angle of view can be read out at the thinning rate of 1/3 in both the horizontal and vertical directions.

In the thinning 2× zoom mode, signals are read out from the second readout angle 602 of view at a thinning rate of 1/2 in both the horizontal and vertical directions. For this purpose, the following selecting operations are performed.

(1) The vertical shift registers and horizontal shift registers select the second readout angle 602 of view.

(2) The vertical shift registers select "one-row readout operation" in "select every other row".

(3) The addition circuit 12 selects "horizontal addition-free operation".

(4) The horizontal shift registers select "select every other column".

In the image sensing element 2, the vertical shift register control line 34 designates "select every other row". The vertical register selection line 36 is selected, and "one-row readout operation" is designated. In response to this, the second readout angle 602 of view is selected, and the vertical address lines 203, 205, 207, and 209 are selected in order.

This operation selects the vertical address line 203 first to read out pixel signals from the third row of the image sensing element 2 and output them to the corresponding vertical signal lines 101 to 112.

In the thinning 2× zoom mode of the embodiment, no horizontal addition is done. The addition circuit 12 directly sends the pixel signals to the horizontal readout circuit 13 to accumulate them in the corresponding accumulation capacitors C401 to C412.

The horizontal shift register control line 74 designates "select every other column". The horizontal register selection line 76 is selected to select the second readout angle 602 of view and select the horizontal address lines 403, 405, 407, and 409 in order.

This operation sequentially sends the signals in the accumulation capacitors C403, C405, C407, and C409 to the output circuit 14 via the horizontal readout control line 501, outputting them from the output terminal 15.

The pixel signals on the third row of the image sensing element 2 that are selected by the vertical address line 203 are output.

Similarly, pixel signals of the image sensing element 2 that are selected by the vertical address lines 205, 207, and 209 can be output sequentially. The signals of the pixels in the second readout angle 602 of view can be read out at the thinning rate of 1/2 in both the horizontal and vertical directions.

In the thinning 3× zoom mode, signals are read out pixel by pixel from the third readout angle 603 of view in both the horizontal and vertical directions. For this purpose, the following selecting operations are performed.

(1) The vertical shift registers and horizontal shift registers select the third readout angle 603 of view.

(2) The vertical shift registers select "one-row readout operation" in "select every row".

(3) The addition circuit 12 selects "horizontal addition-free operation".

(4) The horizontal shift registers select "select every column".

In the image sensing element 2, the vertical shift register control line 34 designates "select every row". The vertical register selection line 37 is selected, and "one-row readout operation" is designated. In response to this, the third readout angle 603 of view is selected, and the vertical address lines 205, 206, 207, and 208 are selected in order.

This operation selects the vertical address line 205 first to read out pixel signals from the fifth row of the image sensing element 2 and output them to the corresponding vertical signal lines 101 to 112.

In the 3× zoom mode of the embodiment, no horizontal addition is done. The addition circuit 12 directly sends the pixel signals to the horizontal readout circuit 13 to accumulate them in the corresponding accumulation capacitors C401 to C412.

The horizontal shift register control line 74 designates "select every column". The horizontal register selection line 77 is selected to select the third readout angle 603 of view and select the horizontal address lines 405, 406, 407, and 408 in order.

This operation sequentially sends the signals in the accumulation capacitors C405, C406, C407, and C408 to the output circuit 14 via the horizontal readout control line 501, outputting them from the output terminal 15.

As a result, the pixel signals on the fifth row of the image sensing element 2 that are selected by the vertical address line 205 are output.

In the same fashion, pixel signals of the image sensing element 2 that are selected by the vertical address lines 206, 207, and 208 can be output sequentially. The signals of the pixels in the third readout angle 603 of view can be read out pixel by pixel in both the horizontal and vertical directions.

The arrangement and operation of the image sensing apparatus according to the first embodiment have been described. To facilitate the understanding, the pixel count of the image sensing element 2 is 12×12 in the horizontal and vertical directions.

In practice, the image sensing apparatus includes an image sensing element having 1,000,000 or more pixels. In the following description, therefore, the total pixel count of the image sensing element 2 in the embodiment is 3,000×2,250 in the horizontal and vertical directions, and the pixel count for movie recording is VGA-compatible 640×480 in the horizontal and vertical directions.

Figure 6:
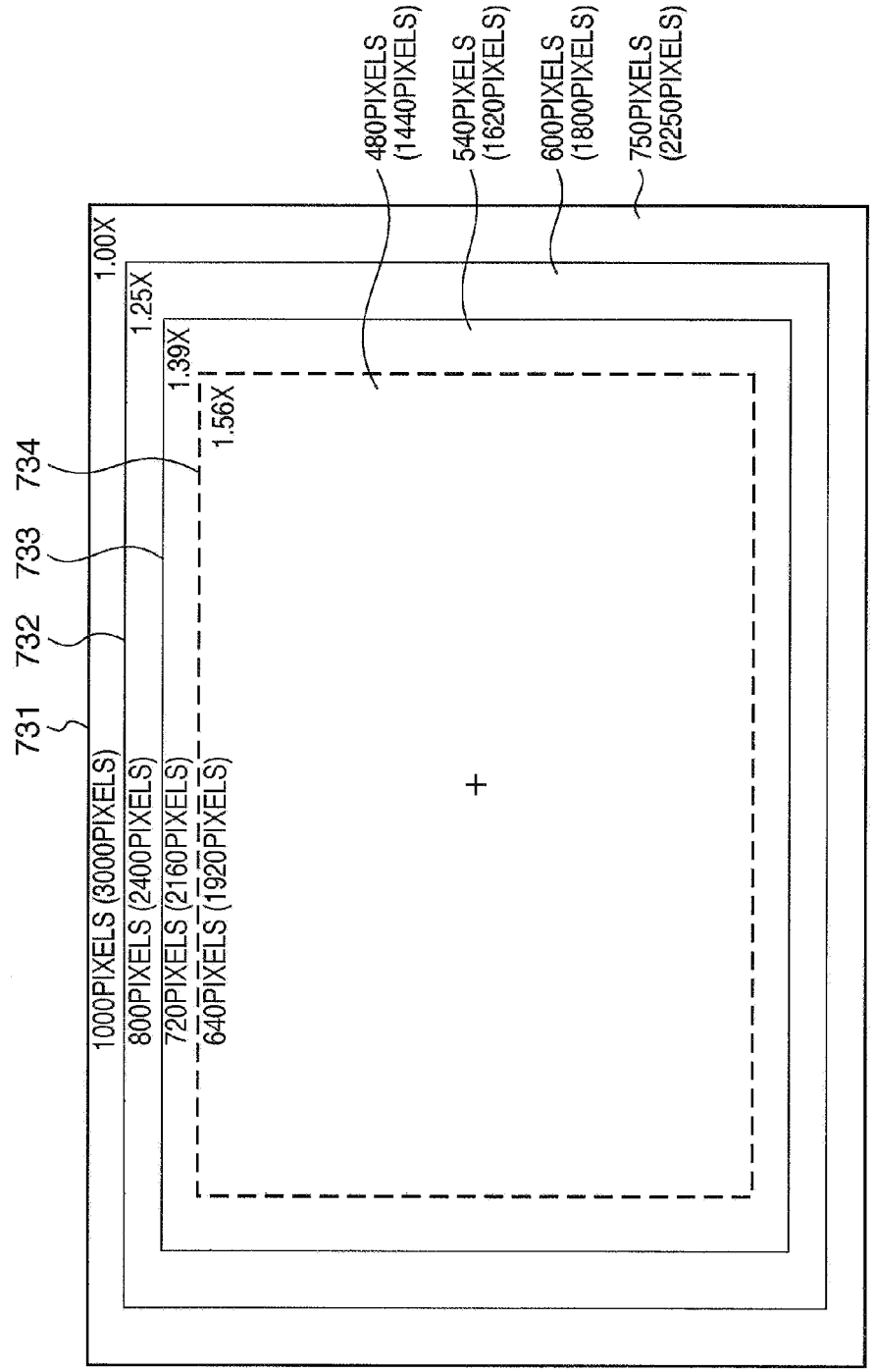
FIG. 6 is a view exemplifying an image read out from all the pixels of the image sensing element while thinning them at a thinning rate of 1/3.

FIG. 6 shows an image read out from all the pixels of the image sensing element 2 while thinning them at a thinning rate of 1/3. This image corresponds to a mode in which signals are read out from the first readout angle 601 of view serving as the full angle of view in FIG. 3 at the 1/3 thinning rate in both the horizontal and vertical directions.

A 1.00× angle 731 of view (full angle of view) is obtained by reading out a total of 3,000×2,250 pixels in the horizontal and vertical directions while thinning them at the 1/3 thinning rate. The horizontal readout pixel count is 1,000 and the vertical one is 750. The 1,000×750 pixels in the horizontal and vertical directions are used to generate an image of 640× 480 pixels in the horizontal and vertical directions. The generated image is equivalent to a 1.00× (equal magnification) electronic zoom image.

A 1.25× angle 732 of view contains 800×600 pixels in the horizontal and vertical directions out of the 1.00× angle 731 of view obtained by thinning readout at the 1/3 thinning rate. The 800×600 pixels in the horizontal and vertical directions are used to generate an image of 640×480 pixels in the horizontal and vertical directions. The generated image is equivalent to a 1.25× electronic zoom image. In this case, a pixel count of the image sensing element 2 corresponding to the 1.25× angle 732 of view is 2,400×1,800 in the horizontal and vertical directions.

A 1.39× angle 733 of view contains 720×540 pixels in the horizontal and vertical directions out of the 1.00× angle 731 of view obtained by thinning readout at the 1/3 thinning rate. The 720×540 pixels in the horizontal and vertical directions are used to generate an image of 640×480 pixels in the horizontal and vertical directions. The generated image is equivalent to a 1.39× electronic zoom image. In this case, a pixel count of the image sensing element 2 corresponding to the 1.39× angle 733 of view is 2,160×1,620 in the horizontal and vertical directions.

A 1.56× angle 734 of view contains 640×480 pixels in the horizontal and vertical directions out of the 1.00× angle 731 of view obtained by thinning readout at the 1/3 thinning rate. An image of 640×480 pixels in the horizontal and vertical directions is directly equivalent to a 1.56× electronic zoom image.

In this case, a pixel count of the image sensing element 2 corresponding to the 1.56× angle 734 of view is 1,920×1,440 in the horizontal and vertical directions.

Figure 7:
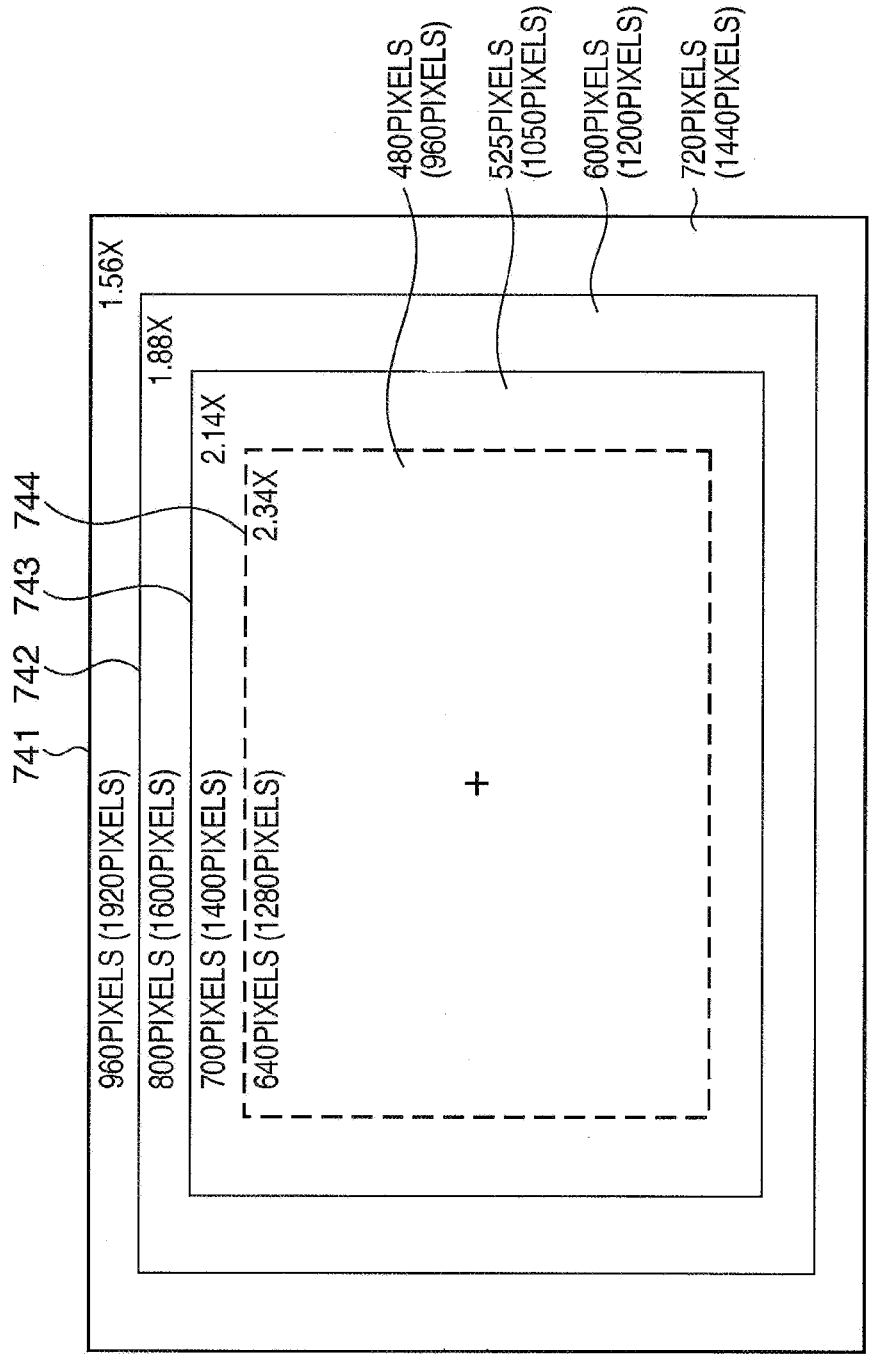
FIG. 7 is a view exemplifying an image read out from pixels corresponding to a 1.56× angle of view in FIG. 6 while thinning them at a thinning rate of 1/2.

FIG. 7 shows an image read out from pixels corresponding to the 1.56× angle 734 of view in FIG. 6 while thinning them at a thinning rate of 1/2. This image corresponds to a mode in which signals are read out from the second readout angle 602 of view in FIG. 3 at the 1/2 thinning rate in both the horizontal and vertical directions.

In this case, signals may be read out only from a region of the image sensing element 2 that corresponds to the 1.56× angle 734 of view, or from a region widened by several or several ten pixels. The added readout pixels can be used for image processing when generating an image of 640×480 pixels in the horizontal and vertical directions, which is the pixel count for movie recording.

A 1.56× angle 741 of view, which corresponds to the 1.56× angle 734 of view in FIG. 6, is obtained by reading out 1,920×1,440 pixels in the horizontal and vertical directions while thinning them at the 1/2 thinning rate. The horizontal readout pixel count is 960 and the vertical one is 720. The 960×720 pixels in the horizontal and vertical directions are used to generate an image of 640×480 pixels in the horizontal and vertical directions. The generated image is equivalent to a 1.56× electronic zoom image.

A 1.88× angle 742 of view contains 800×600 pixels in the horizontal and vertical directions out of the 1.56× angle 741 of view obtained by thinning readout at the 1/2 thinning rate. The 800×600 pixels in the horizontal and vertical directions are used to generate an image of 640×480 pixels in the horizontal and vertical directions. The generated image is equivalent to a 1.88× electronic zoom image. In this case, a pixel count of the image sensing element 2 corresponding to the 1.88× angle 742 of view is 1,600×1,200 in the horizontal and vertical directions.

A 2.14× angle 743 of view contains 700×525 pixels in the horizontal and vertical directions out of the 1.56× angle 741 of view obtained by thinning readout at the 1/2 thinning rate. The 700×525 pixels in the horizontal and vertical directions are used to generate an image of 640×480 pixels in the horizontal and vertical directions. The generated image is equivalent to a 2.14× electronic zoom image. In this case, a pixel count of the image sensing element 2 corresponding to the 2.14× angle 743 of view is 1,400×1,050 in the horizontal and vertical directions.

A 2.34× angle 744 of view contains 640×480 pixels in the horizontal and vertical directions out of the 1.56× angle 741 of view obtained by thinning readout at the 1/2 thinning rate. An image of 640×480 pixels in the horizontal and vertical directions is directly equivalent to a 2.34× electronic zoom image. In this case, a pixel count of the image sensing element 2 corresponding to the 2.34× angle 744 of view is 1,280×960 in the horizontal and vertical directions.

Figure 8:
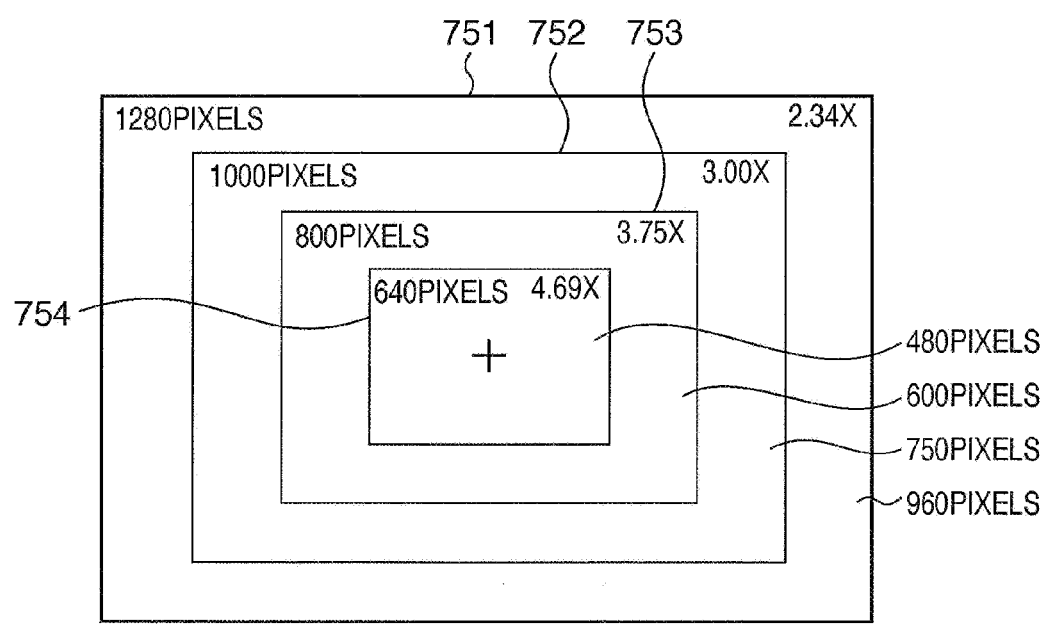
FIG. 8 is a view exemplifying an image read out from pixels corresponding to a 2.34× angle of view in FIG. 7 one by one in the horizontal and vertical directions.

FIG. 8 shows an image read out one by one from pixels corresponding to the 2.34× angle 744 of view in FIG. 7 in both the horizontal and vertical directions. This image corresponds to a mode in which signals are read out pixel by pixel from the third readout angle 603 of view in FIG. 3 in both the horizontal and vertical directions. In other words, signals are read out at a thinning rate of 1/1 in this mode.

In this case, signals may be read out only from a region of the image sensing element 2 that corresponds to the 2.34× angle 744 of view, or from a region widened by several or several ten pixels. The added readout pixels can be used for image processing when generating an image of 640×480 pixels in the horizontal and vertical directions, which is the pixel count for movie recording.

A 2.34× angle 751 of view, which corresponds to the 2.34× angle 744 of view in FIG. 7, is obtained by reading out 1,280×960 pixels in the horizontal and vertical directions at the 1/1 thinning rate. The 1,280×960 readout pixels in the horizontal and vertical directions are used to generate an image of 640×480 pixels in the horizontal and vertical directions. The generated image is equivalent to a 2.34× electronic zoom image.

A 3.00× angle 752 of view contains 1,000×750 pixels in the horizontal and vertical directions out of the 2.34× angle 751 of view obtained by readout at the 1/1 thinning rate. The 1,000×750 pixels in the horizontal and vertical directions are used to generate an image of 640×480 pixels in the horizontal and vertical directions. The generated image is equivalent to a 3.00× electronic zoom image.

A 3.75× angle 753 of view contains 800×600 pixels in the horizontal and vertical directions out of the 2.34× angle 751 of view obtained by readout at the 1/1 thinning rate. The 800×600 pixels in the horizontal and vertical directions are used to generate an image of 640×480 pixels in the horizontal and vertical directions. The generated image is equivalent to a 3.75× electronic zoom image.

A 4.69× angle 754 of view contains 640×480 pixels in the horizontal and vertical directions out of the 2.34× angle 751 of view obtained by readout at the 1/1 thinning rate. An image of 640×480 pixels in the horizontal and vertical directions is directly equivalent to a 4.69× electronic zoom image.

The centers of the angles 731 to 734 of view, angles 741 to 744 of view, and angles 751 to 754 of view coincide or almost coincide with each other.

The angles 731 to 734 of view, angles 741 to 744 of view, and angles 751 to 754 of view are used to generate images of 640×480 pixels in the horizontal and vertical directions for movie recording. Thus, these angles of view may be expressed as electronic zoom stop positions.

Image processing by the image sensing apparatus sometimes requires several or several ten filtering pixels outside the recording region when performing pixel interpolation by the R interpolation circuit 91, G interpolation circuit 92, and B interpolation circuit 93, and removal of a false color such as moire by the color signal correction circuit 95. The readout angle of view of the image sensing element 2 and the readout angle of view of the electronic zoom may be determined to arrange several or several ten filtering pixels outside the angle of view used in the embodiment.

The operation of the electronic zoom will be explained with reference to FIGS. 6 to 8.

In (1) of <control of electronic zoom>, control of the electronic zoom starts in response to an instruction from the zoom button or zoom lever of the operation unit 9.

In (2) of <control of electronic zoom>, the synchronous control unit 10 detects which of the high- and low-magnification sides is designated with the zoom button or zoom lever of the operation unit 9. The synchronous control unit 10 decides the next electronic zoom stop position from the current one, and switches driving of the image sensing element 2.

First, a case will be described, in which the electronic zoom magnification upon power-on is assumed to be the 1.00× (equal magnification) electronic zoom stop position in FIG. 6 and the operation unit 9 is used to electronically zoom toward the high-magnification side.

If an instruction is input from the operation unit 9 to zoom toward the low-magnification side, no lower electronic zoom magnification can be set, so the synchronous control unit 10 ignores the instruction.

For the 1.00× (equal magnification) electronic zoom, the image sensing element 2 reads out signals from the 1.00× angle 731 of view serving as the full angle of view in FIG. 6 while thinning them at a thinning rate of 1/3. The signal processing unit 5 generates an image of 640×480 pixels in the horizontal and vertical directions using the 1,000×750 readout pixels in the horizontal and vertical directions. The generated image is displayed or recorded, or displayed and recorded.

Since the instruction from the operation unit 9 is to zoom toward the high-magnification side, 800×600 pixels in the horizontal and vertical directions in the 1.25× angle 732 of view are used while the 1.00× angle 731 of view serving as the full angle of view in FIG. 6 is kept set for readout from the image sensing element 2. The signal processing unit 5 generates an image of 640×480 pixels in the horizontal and vertical directions. If the instruction from the operation unit 9 ends, the image generated by continuously reading out signals from the image sensing element 2 is displayed or recorded, or displayed and recorded as a 1.25× electronic zoom image.

If the instruction is kept input from the operation unit 9 to zoom toward the high-magnification side, 720×540 pixels in the horizontal and vertical directions in the 1.39× angle 733 of view are used while the 1.00× angle 731 of view serving as the full angle of view in FIG. 6 is kept set for readout from the image sensing element 2. The signal processing unit 5 generates an image of 640×480 pixels in the horizontal and vertical directions. If the instruction from the operation unit 9 ends, the image generated by continuously reading out signals from the image sensing element 2 is displayed or recorded, or displayed and recorded as a 1.39× electronic zoom image.

If the instruction is kept input from the operation unit 9 to zoom toward the high-magnification side, readout from the image sensing element 2 is switched to the angle of view in FIG. 7, and signals are read out from the 1.56× angle 741 of view while thinning them at a thinning rate of 1/2. The signal processing unit 5 generates an image of 640×480 pixels in the horizontal and vertical directions using 960×720 readout pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 1.56× electronic zoom image.

If the instruction is kept input from the operation unit 9 to zoom toward the high-magnification side, 800×600 pixels in the horizontal and vertical directions in the 1.88× angle 742 of view are used while the 1.56× angle 741 of view in FIG. 7 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 1.88× electronic zoom image.

If the instruction is kept input from the operation unit 9 to zoom toward the high-magnification side, 700×525 pixels in the horizontal and vertical directions in the 2.14× angle 743 of view are used while the 1.56× angle 741 of view in FIG. 7 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 2.14× electronic zoom image.

If the instruction is kept input from the operation unit 9 to zoom toward the high-magnification side, readout from the image sensing element 2 is switched to the angle of view in FIG. 8, and signals are read out from the 2.34× angle 751 of view at a thinning rate of 1/1. The signal processing unit 5 generates an image of 640×480 pixels in the horizontal and vertical directions using 1,280×960 readout pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 2.34× electronic zoom image.

If the instruction is kept input from the operation unit 9 to zoom toward the high-magnification side, 1,000×750 pixels in the horizontal and vertical directions in the 3.00× angle 752 of view are used while the 2.34× angle 751 of view in FIG. 8 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 3.00× electronic zoom image.

If the instruction is kept input from the operation unit 9 to zoom toward the high-magnification side, 800×600 pixels in the horizontal and vertical directions in the 3.75× angle 753 of view are used while the 2.34× angle 751 of view in FIG. 8 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 3.75× electronic zoom image.

If the instruction is kept input from the operation unit 9 to zoom toward the high-magnification side, 640×480 pixels in the horizontal and vertical directions in the 4.69× angle 754 of view are used while the 2.34× angle 751 of view in FIG. 8 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 4.69× electronic zoom image.

If the instruction is kept input from the operation unit 9 to zoom toward the high-magnification side, no higher electronic zoom magnification can be set, so the synchronous control unit 10 ignores the instruction.

Next, a case will be described, in which the electronic zoom stop position is assumed to be the 4.69× electronic zoom stop position in FIG. 8 and the operation unit 9 is used to electronically zoom toward the low-magnification side.

The operation at each electronic zoom stop position is the same as that when electronically zooming toward the high-magnification side, and a description thereof will not be repeated.

For the 4.69× to 2.34× electronic zooms, the angle of view changes in order from the 4.69× angle 754 of view to the 2.34× angle 751 of view while keeping the mode in which the image sensing element 2 reads out signals from the 2.34× angle 751 of view in FIG. 8 at a thinning rate of 1/1. The signal processing unit 5 generates an image of 640×480 pixels in the horizontal and vertical directions based on each electronic zoom magnification. The generated image is displayed or recorded, or displayed and recorded.

For the 2.14× to 1.56× electronic zooms, readout from the image sensing element 2 is switched to the angle of view in FIG. 7. The angle of view changes in order from the 2.14× angle 743 of view to the 1.56× angle 741 of view while keeping the mode in which signals are read out from the 1.56× angle 741 of view at a thinning rate of 1/2. The signal processing unit 5 generates an image of 640×480 pixels in the horizontal and vertical directions based on each electronic zoom magnification. The generated image is displayed or recorded, or displayed and recorded.

For the 1.39× to 1.00× (equal magnification) electronic zooms, readout from the image sensing element 2 is switched to the angle of view in FIG. 6. The angle of view changes in order from the 1.39× angle 733 of view to the 1.00× angle 731 of view while keeping the mode in which signals are read out from the 1.00× angle 731 of view at a thinning rate of 1/3. The signal processing unit 5 generates an image of 640×480 pixels in the horizontal and vertical directions based on each electronic zoom magnification. The generated image is displayed or recorded, or displayed and recorded.

Also when the electronic zoom is done from an intermediate electronic zoom stop position toward the high- or low-magnification side, it starts from an intermediate angle of view as described above in accordance with an instruction from the operation unit 9 to electronically zoom toward the high- or low-magnification side. A description of this operation will be omitted.

It is also possible to set an angle of view smaller than the 4.69× angle 754 of view in FIG. 8, and execute or combine a higher-magnification electronic zoom though the resolution degrades.

As described above, according to the first embodiment, a zoom image is always generated using 640×480 or more pixels in the horizontal and vertical directions which are equal to or higher than the pixel count for movie recording. An electronic zoom almost free from the degradation of resolution can be provided.

While 10 electronic zoom stop positions are set, three readout angles of view suffice for the image sensing element 2. This can reduce the complexity of control of the image sensing element 2.

In the first embodiment, the pixel count of the 2.34× angle 751 of view serving as the readout angle of view of the image sensing element 2 shown in FIG. 8 is twice as large as the movie recording pixel count of 640×480 pixels in the horizontal and vertical directions. The value "2" is calculated by (1/1)/(1/2)=2 based on the ratio between the 1/1 thinning rate of the 2.34× angle 751 of view in FIG. 8 and the 1/2 thinning rate of the 1.56× angle 741 of view serving as the readout angle of view of the image sensing element 2 shown in FIG. 7.

The pixel count of the 1.56× angle 741 of view serving as the readout angle of view of the image sensing element 2 shown in FIG. 7 is 1.5 times as large as the movie recording pixel count of 640×480 pixels in the horizontal and vertical directions. The value "1.5" is calculated by (1/2)/(1/3)=3/2=1.5 based on the ratio between the 1/2 thinning rate of the 1.56× angle 741 of view in FIG. 7 and the 1/3 thinning rate of the 1.00× angle 731 of view serving as the readout angle of view of the image sensing element 2 shown in FIG. 6.

That is, let p be a natural number, 1/(p+1) be the first thinning rate before switching the readout angle of view, and 1/p be the second thinning rate after switching it. In this case, a pixel count at which signals are read out from a readout angle of view at a thinning rate before switching is (p+1)/p times or more in both the horizontal and vertical directions.

In comparison with the pixel count of the 1.00× angle 731 of view serving as the readout angle of view of the image sensing element 2 shown in FIG. 6, the pixel count of the 1.00× angle 731 of view:that of the 1.56× angle 741 of view:that of the 2.34× angle 751 of view
=(1000×750): (960×720): (1280×960)
=750000:691200:1228800

The ratio between the maximum and minimum readout pixel counts falls within 1/2.

This setting can prevent the readout time of a shot image from becoming long within the region when the electronic zoom is executed.

Signals need not always be read out from all pixels, so a decrease in frame rate can be suppressed.

It is known that the image quality differs between an image generated from an image having the movie recording pixel count of 640×480 pixels or more in the horizontal and vertical directions without decreasing the pixel count and an image generated from an image having the movie recording pixel count (640×480) while decreasing the pixel count. That is, the resolution after image processing and the quality of a false color such as color noise or moire changes.

The first embodiment does not utilize modes in which an image is generated from 640×480 pixels in the horizontal and vertical directions, which is the pixel count for movie recording, in the 1.56× angle 734 of view in FIG. 6 and the 2.34× angle 744 of view in FIG. 7. Thus, the same image quality can always be maintained.

Only for the 4.69× angle 754 of view in FIG. 8, an image is generated from 640×480 pixels in the horizontal and vertical directions, which is the pixel count for movie recording. However, the thinning rate has already reached 1/1, and the same image processing method as that for other angles of view cannot expect the effect of maintaining the image quality, unlike the other angles of view.

The first embodiment does not use modes in which an image is generated from 640×480 pixels in the horizontal and vertical directions, which is the pixel count for movie recording, in the 1.56× angle 734 of view in FIG. 6 and the 2.34× angle 744 of view in FIG. 7. Hence, these modes may be omitted.

[Second Embodiment]

The second embodiment will be described below with reference to FIGS. 1 to 8. The arrangements in FIGS. 1 to 5 are the same as those in the first embodiment, and a description thereof will not be repeated.

In the first embodiment, the readout angle of view of the image sensing element 2 is switched between the 1.39× and 1.56× electronic zooms and between the 2.14× and 2.34× electronic zooms along with an operation to change the electronic zoom magnification.

More specifically, driving of the image sensing element 2 is switched between the 1.39× angle 733 of view in FIG. 6 and the 1.56× angle 741 of view in FIG. 7 and between the 2.14× angle 743 of view in FIG. 7 and the 2.34× angle 751 of view in FIG. 8.

For example, when an instruction from the operation unit 9 stops between the 1.39× and 1.56× electronic zooms, the synchronous control unit 10 selects either the 1.39× angle 733 of view in FIG. 6 or the 1.56× angle 741 of view in FIG. 7. If the control has not been completed, the image sensing element 2 is frequently switched between the 1.39× angle 733 of view in FIG. 6 and the 1.56× angle 741 of view in FIG. 7.

In this case, the synchronous control unit 10 repetitively executes control to simultaneously switch driving control of the image sensing element 2 and operation control of the signal processing unit 5. This places a heavy burden on the synchronous control unit 10, obstructing control of the optical system 1, the memory 6 for storing an image, the image display unit 7, the image recording unit 8, the operation unit 9, and the like.

In the second embodiment, an electronic zoom operation which does not frequently repeat switching of the readout angle of view of an image sensing element 2 will be explained with reference to FIGS. 6 to 8.

Similar to the first embodiment, in (1) of <control of electronic zoom>, control of the electronic zoom starts in response to an instruction from the zoom button or zoom lever of an operation unit 9.

In (2) of <control of electronic zoom>, a synchronous control unit 10 detects which of the high- and low-magnification sides is designated with the zoom button or zoom lever of the operation unit 9. The synchronous control unit 10 decides the next electronic zoom stop position from the current one, and switches driving of the image sensing element 2.

First, a case will be described, in which the electronic zoom magnification upon power-on is assumed to be the 1.00× (equal magnification) electronic zoom stop position in FIG. 6 and the operation unit 9 is used to electronically zoom toward the high-magnification side.

As for the operation at each electronic zoom stop position, a description of the same operation as that in the first embodiment will not be repeated.

If an instruction is input from the operation unit 9 to zoom toward the low-magnification side, no lower electronic zoom magnification can be set, so the synchronous control unit 10 ignores the instruction.

For the 1.00× (equal magnification) electronic zoom, the image sensing element 2 reads out signals from a 1.00× angle 731 of view serving as the full angle of view in FIG. 6 while thinning them at a thinning rate of 1/3. A signal processing unit 5 generates an image of 640×480 pixels in the horizontal and vertical directions using the 1,000×750 readout pixels in the horizontal and vertical directions. The generated image is displayed or recorded, or displayed and recorded.

For the 1.00× (equal magnification) to 1.39× electronic zooms, the angle of view changes in order from the 1.00× angle 731 of view to a 1.39× angle 733 of view while keeping the mode in which the image sensing element 2 reads out signals from the 1.00× angle 731 of view in FIG. 6 at the 1/3 thinning rate.

The signal processing unit 5 generates an image of 640×480 pixels in the horizontal and vertical directions based on each electronic zoom magnification. The generated image is displayed or recorded, or displayed and recorded.

For the 1.56× electronic zoom, 640×480 pixels in a 1.56× angle 734 of view are used while the 1.00× angle 731 of view serving as the full angle of view in FIG. 6 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 1.56× electronic zoom image.

For the 1.88× to 2.14× electronic zooms, readout from the image sensing element 2 is switched to the angle of view in FIG. 7. The angle of view changes in order from a 1.88× angle 742 of view to a 2.14× angle 743 of view while keeping the mode in which signals are read out from a 1.56× angle 741 of view at a thinning rate of 1/2. The signal processing unit 5 generates an image of 640×480 pixels in the horizontal and vertical directions based on each electronic zoom magnification. The generated image is displayed or recorded, or displayed and recorded.

For the 2.34× electronic zoom, 640×480 pixels in a 2.34× angle 744 of view are used while the 1.56× angle 741 of view in FIG. 7 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 2.34× electronic zoom image.

For the 3.00× to 4.69× electronic zooms, readout from the image sensing element 2 is switched to the angle of view in FIG. 8. The angle of view changes in order from a 3.00× angle 752 of view to a 4.69× angle 754 of view while keeping the mode in which signals are read out from a 2.34× angle 751 of view at a thinning rate of 1/1. The signal processing unit 5 generates an image of 640×480 pixels in the horizontal and vertical directions based on each electronic zoom magnification. The generated image is displayed or recorded, or displayed and recorded.

If the instruction is kept input from the operation unit 9 to zoom toward the high-magnification side, no higher electronic zoom magnification can be set, so the synchronous control unit 10 ignores the instruction.

Next, a case will be described, in which the electronic zoom stop position is assumed to be the 4.69× electronic zoom stop position in FIG. 8 and the operation unit 9 is used to electronically zoom toward the low-magnification side.

As for the operation at each electronic zoom stop position, a description of the same operation as that in the first embodiment will not be repeated.

For the 4.69× to 2.34× electronic zooms, the angle of view changes in order from the 4.69× angle 754 of view to the 2.34× angle 751 of view while keeping the mode in which the image sensing element 2 reads out signals from the 2.34× angle 751 of view in FIG. 8 at a thinning rate of 1/1. The signal processing unit 5 generates an image of 640×480 pixels in the horizontal and vertical directions based on each electronic zoom magnification. The generated image is displayed or recorded, or displayed and recorded.

For the 2.14× to 1.56× electronic zooms, readout from the image sensing element 2 is switched to the angle of view in FIG. 7. The angle of view changes in order from the 2.14× angle 743 of view to the 1.56× angle 741 of view while keeping the mode in which signals are read out from the 1.56× angle 741 of view at a thinning rate of 1/2. The signal processing unit 5 generates an image of 640×480 pixels in the horizontal and vertical directions based on each electronic zoom magnification. The generated image is displayed or recorded, or displayed and recorded.

For the 1.39× to 1.00× (equal magnification) electronic zooms, readout from the image sensing element 2 is switched to the angle of view in FIG. 6. The angle of view changes in order from the 1.39× angle 733 of view to the 1.00× angle 731 of view while keeping the mode in which signals are read out from the 1.00× angle 731 of view at a thinning rate of 1/3. The signal processing unit 5 generates an image of 640×480 pixels in the horizontal and vertical directions based on each electronic zoom magnification. The generated image is displayed or recorded, or displayed and recorded.

Also when the electronic zoom is done from an intermediate electronic zoom stop position toward the high- or low-magnification side, it starts from an intermediate angle of view as described above in accordance with an instruction from the operation unit 9 to electronically zoom toward the high- or low-magnification side. A description of this operation will be omitted.

It is also possible to set an angle of view smaller than the 4.69× angle 754 of view in FIG. 8, and execute or combine a higher-magnification electronic zoom though the resolution degrades.

As described above, according to the second embodiment, a zoom image is always generated using 640×480 or more pixels in the horizontal and vertical directions which are equal to or higher than the pixel count for movie recording. An electronic zoom almost free from the degradation of resolution can be achieved.

While 12 electronic zoom stop positions are set, three readout angles of view suffice for the image sensing element 2. This can reduce the complexity of control of the image sensing element.

In the second embodiment, the pixel count of the 2.34× angle 751 of view serving as the readout angle of view of the image sensing element 2 shown in FIG. 8 is twice as large as the movie recording pixel count of 640×480 pixels in the horizontal and vertical directions.

The pixel count of the 1.56× angle 741 of view serving as the readout angle of view of the image sensing element 2 shown in FIG. 7 is 1.5 times as large as the movie recording pixel count of 640×480 pixels in the horizontal and vertical directions.

In comparison with the pixel count of the 1.00× angle 731 of view serving as the readout angle of view of the image sensing element 2 shown in FIG. 6, the pixel count of the 1.00× angle 731 of view:that of the 1.56× angle 741 of view:that of the 2.34× angle 751 of view
=(1000×750) pixels:(960×720) pixels:(1280×960) pixels
=750000 pixels:691200 pixels:1228800 pixels The ratio between the maximum and minimum readout pixel counts falls within 1/2.

This setting can prevent the readout time of a shot image from becoming long within the region when the electronic zoom is executed.

Signals need not always be read out from all pixels, so a decrease in frame rate can be suppressed.

In the second embodiment, when the electronic zoom is executed toward the high-magnification side, the readout angle of view of the image sensing element 2 is switched between the 1.56× and 1.88× electronic zooms and between the 2.34× and 3.00× electronic zooms. When the electronic zoom is done toward the low-magnification side, the readout angle of view of the image sensing element 2 is switched between the 2.34× and 2.14× electronic zooms and between the 1.56× and 1.39× electronic zooms.

That is, the switching point of the readout angle of view of the image sensing element 2 differs between electronic zooming toward the high-magnification side and that toward the low-magnification side. At any zoom stop position, a change of the angle of view accompanied by switching the readout angle of view of the image sensing element 2 is not frequently repeated. The control rule becomes clear, reducing the burden on the synchronous control unit 10.

[Third Embodiment]

The third embodiment will be described below with reference to FIGS. 1 to 5 and 9 to 11. The arrangements in FIGS. 1 to 5 are the same as those in the first embodiment, and a description thereof will not be repeated.

The third embodiment executes an electronic zoom operation which does not frequently repeat switching of the readout angle of view of an image sensing element 2 while suppressing the degradation of resolution and image quality.

Also in the third embodiment, the total pixel count of the image sensing element 2 is 3,000×2,250 in the horizontal and vertical directions, and the pixel count for movie recording is VGA-compatible 640×480 in the horizontal and vertical directions.

Figure 9:
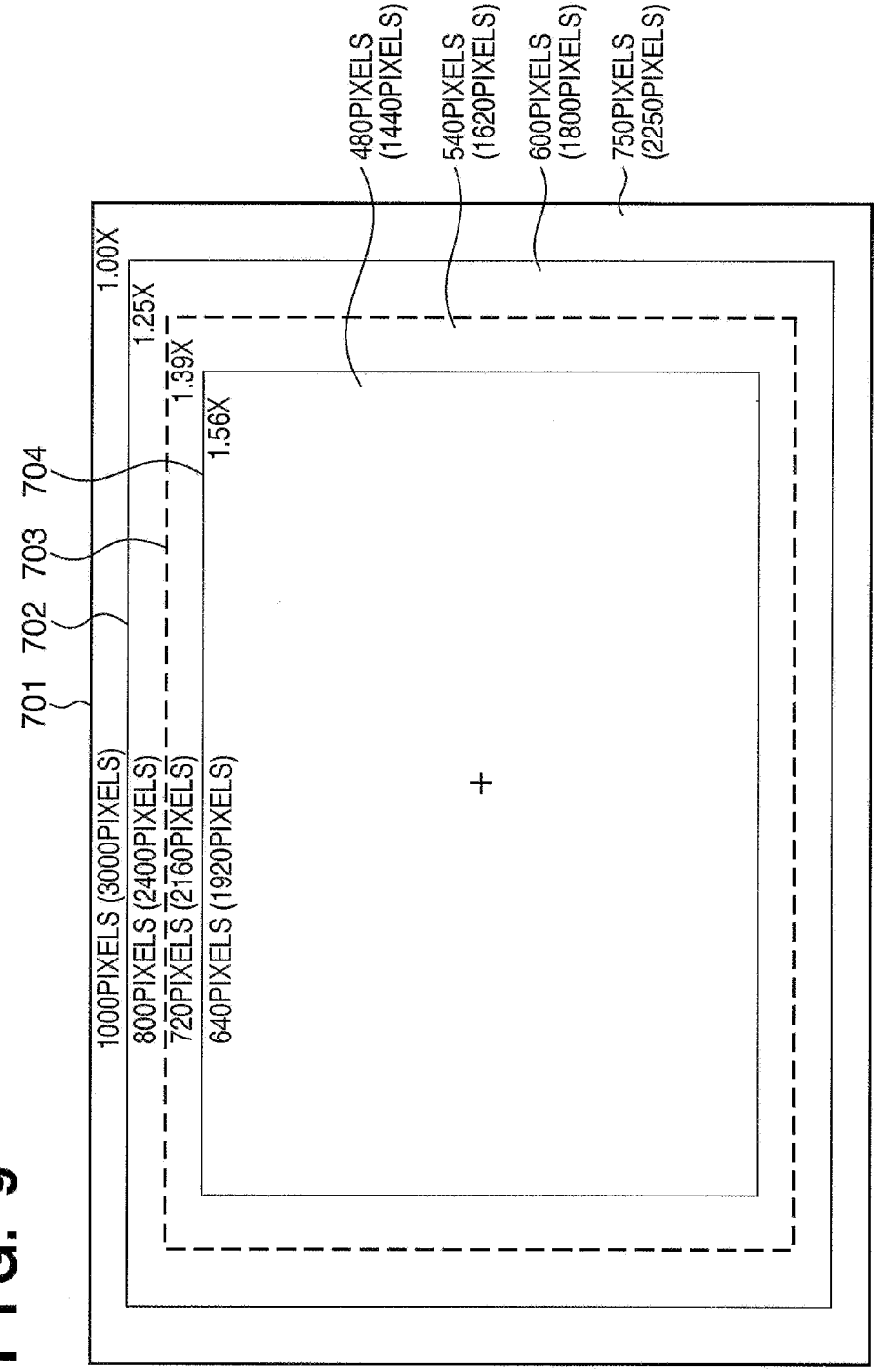
FIG. 9 is a view exemplifying an image read out from all the pixels of the image sensing element while thinning them at a thinning rate of 1/3.

FIG. 9 is a view showing an image read out from all the pixels of the image sensing element 2 while thinning them at a thinning rate of 1/3. This image corresponds to a mode in which signals are read out from a first readout angle 601 of view in FIG. 3 at the 1/3 thinning rate in both the horizontal and vertical directions.

A 1.00× angle 701 of view (full angle of view) is obtained by reading out a total of 3,000×2,250 pixels in the horizontal and vertical directions while thinning them at the 1/3 thinning rate. The horizontal readout pixel count is 1,000 and the vertical one is 750. The 1,000×750 pixels in the horizontal and vertical directions are used to generate an image of 640× 480 pixels in the horizontal and vertical directions. The generated image is equivalent to a 1.00× (equal magnification) electronic zoom image.

A 1.25× angle 702 of view contains 800×600 pixels in the horizontal and vertical directions out of the 1.00× angle 701 of view obtained by thinning readout at the 1/3 thinning rate. The 800×600 pixels in the horizontal and vertical directions are used to generate an image of 640×480 pixels in the horizontal and vertical directions. The generated image is equivalent to a 1.25× electronic zoom image. In this case, a pixel count of the image sensing element 2 corresponding to the 1.25× angle 702 of view is 2,400×1,800 in the horizontal and vertical directions.

A 1.39× angle 703 of view contains 720×540 pixels in the horizontal and vertical directions out of the 1.00× angle 701 of view obtained by thinning readout at the 1/3 thinning rate. The 720×540 pixels in the horizontal and vertical directions are used to generate an image of 640×480 pixels in the horizontal and vertical directions. The generated image is equivalent to a 1.39× electronic zoom image. In this case, a pixel count of the image sensing element 2 corresponding to the 1.39× angle 703 of view is 2,160×1,620 in the horizontal and vertical directions.

A 1.56× angle 704 of view contains 640×480 pixels in the horizontal and vertical directions out of the 1.00× angle 701 of view obtained by thinning readout at the ⅓ thinning rate. An image of 640×480 pixels in the horizontal and vertical directions is directly equivalent to a 1.56× electronic zoom image. In this case, a pixel count of the image sensing element 2 corresponding to the 1.56× angle 704 of view is 1,920×1,440 in the horizontal and vertical directions.

Figure 10:
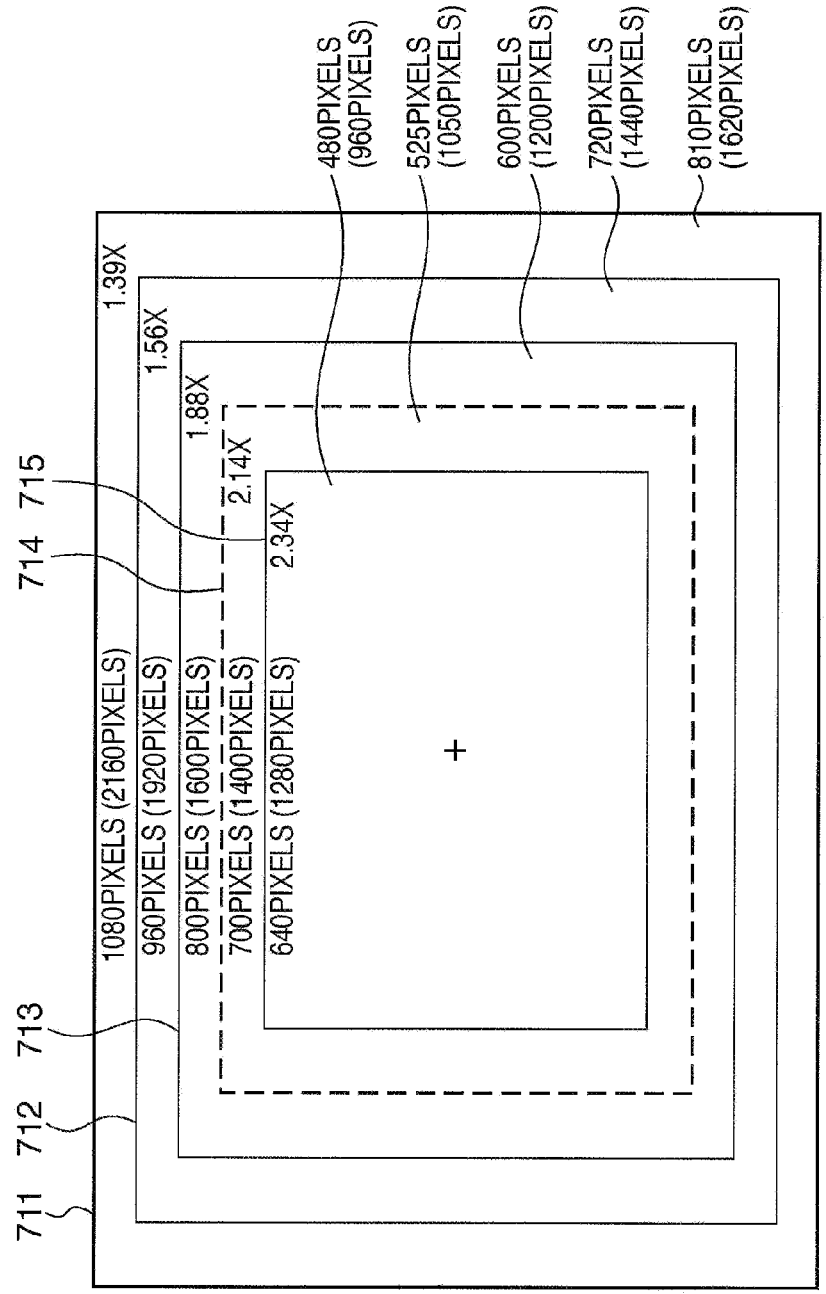
FIG. 10 is a view exemplifying an image read out from pixels corresponding to a 1.39× angle of view in FIG. 9 while thinning them at a thinning rate of 1/2.

FIG. 10 shows an image read out from pixels corresponding to the 1.39× angle 703 of view in FIG. 9 while thinning them at a thinning rate of 1/2. This image corresponds to a mode in which signals are read out from a second readout angle 602 of view in FIG. 3 at the 1/2 thinning rate in both the horizontal and vertical directions.

In this case, signals may be read out only from a region of the image sensing element 2 that corresponds to the 1.39× angle 703 of view, or from a region widened by several or several ten pixels. The added readout pixels can be used for image processing when generating an image of 640×480 pixels in the horizontal and vertical directions, which is the pixel count for movie recording.

A 1.39× angle 711 of view, which corresponds to the 1.39× angle 703 of view in FIG. 9, is obtained by reading out 2,160×1,620 pixels in the horizontal and vertical directions while thinning them at the 1/2 thinning rate. The horizontal readout pixel count is 1,080 and the vertical one is 810. The 1,080×810 pixels in the horizontal and vertical directions are used to generate an image of 640×480 pixels in the horizontal and vertical directions. The generated image is equivalent to a 1.39× electronic zoom image.

A 1.56× angle 712 of view contains 960×720 pixels in the horizontal and vertical directions out of the 1.39× angle 711 of view obtained by thinning readout at the 1/2 thinning rate. The 960×720 pixels in the horizontal and vertical directions are used to generate an image of 640×480 pixels in the horizontal and vertical directions. The generated image is equivalent to a 1.56× electronic zoom image. In this case, a pixel count of the image sensing element 2 corresponding to the 1.56× angle 712 of view is 1,920×1,440 in the horizontal and vertical directions.

A 1.88× angle 713 of view contains 800×600 pixels in the horizontal and vertical directions out of the 1.39× angle 711 of view obtained by thinning readout at the 1/2 thinning rate. The 800×600 pixels in the horizontal and vertical directions are used to generate an image of 640×480 pixels in the horizontal and vertical directions. The generated image is equivalent to a 1.88× electronic zoom image. In this case, a pixel count of the image sensing element 2 corresponding to the 1.88× angle 713 of view is 1,600×1,200 in the horizontal and vertical directions.

A 2.14× angle 714 of view contains 700×525 pixels in the horizontal and vertical directions out of the 1.39× angle 711 of view obtained by thinning readout at the 1/2 thinning rate. The 700×525 pixels in the horizontal and vertical directions are used to generate an image of 640×480 pixels in the horizontal and vertical directions. The generated image is equivalent to a 2.14× electronic zoom image. In this case, a pixel count of the image sensing element 2 corresponding to the 2.14× angle 714 of view is 1,400×1,050 in the horizontal and vertical directions.

A 2.34× angle 715 of view contains 640×480 pixels in the horizontal and vertical directions out of the 1.39× angle 711 of view obtained by thinning readout at the 1/2 thinning rate. An image of 640×480 pixels in the horizontal and vertical directions is directly equivalent to a 2.34× electronic zoom image. In this case, a pixel count of the image sensing element 2 corresponding to the 2.34× angle 715 of view is 1,280×960 in the horizontal and vertical directions.

FIG. 11 shows an image read out one by one from pixels corresponding to the 2.14× angle 714 of view in FIG. 10 in both the horizontal and vertical directions. This image corresponds to a mode in which signals are read out pixel by pixel from a third readout angle 603 of view in FIG. 3 in both the horizontal and vertical directions. In other words, signals are read out at a thinning rate of 1/1 in this mode.

In this case, signals may be read out only from a region of the image sensing element 2 that corresponds to the 2.14× angle 714 of view, or from a region widened by several or several ten pixels. The added readout pixels can be used for image processing when generating an image of 640×480 pixels in the horizontal and vertical directions, which is the pixel count for movie recording.

A 2.14× angle 721 of view, which corresponds to the 2.14× angle 714 of view in FIG. 10, is obtained by reading out 1,400×1,050 pixels in the horizontal and vertical directions at the 1/1 thinning rate. The 1,400×1,050 readout pixels in the horizontal and vertical directions are used to generate an image of 640×480 pixels in the horizontal and vertical directions. The generated image is equivalent to a 2.14× electronic zoom image.

A 2.34× angle 722 of view contains 1,280×960 pixels in the horizontal and vertical directions out of the 2.14× angle 721 of view obtained by readout at the 1/1 thinning rate. The 1,280×960 pixels in the horizontal and vertical directions are used to generate an image of 640×480 pixels in the horizontal and vertical directions. The generated image is equivalent to a 2.34× electronic zoom image.

A 3.00× angle 723 of view contains 1,000×750 pixels in the horizontal and vertical directions out of the 2.14× angle 721 of view obtained by readout at the 1/1 thinning rate. The 1,000×750 pixels in the horizontal and vertical directions are used to generate an image of 640×480 pixels in the horizontal and vertical directions. The generated image is equivalent to a 3.00× electronic zoom image.

A 3.75× angle 724 of view contains 800×600 pixels in the horizontal and vertical directions out of the 2.14× angle 721 of view obtained by readout at the 1/1 thinning rate. The 800×600 pixels in the horizontal and vertical directions are used to generate an image of 640×480 pixels in the horizontal and vertical directions. The generated image is equivalent to a 3.75× electronic zoom image.

A 4.69× angle 725 of view contains 640×480 pixels in the horizontal and vertical directions out of the 2.14× angle 721 of view obtained by readout at the 1/1 thinning rate. An image of 640×480 pixels in the horizontal and vertical directions is directly equivalent to a 4.69× electronic zoom image.

The centers of the angles 701 to 704 of view, angles 711 to 715 of view, and angles 721 to 725 of view coincide or almost coincide with each other.

The angles 701 to 704 of view, angles 711 to 715 of view, and angles 721 to 725 of view are used to generate images of 640×480 pixels in the horizontal and vertical directions for movie recording. Thus, these angles of view may be expressed as electronic zoom stop positions.

Image processing by an image sensing apparatus sometimes requires several or several ten filtering pixels outside the recording region when performing pixel interpolation by an R interpolation circuit 91, G interpolation circuit 92, and B interpolation circuit 93, and removal of a false color such as moire by a color signal correction circuit 95. The readout angle of view of the image sensing element 2 and the readout angle of view of the electronic zoom may be determined to arrange several or several ten filtering pixels outside the angle of view used in the embodiment.

The operation of the electronic zoom will be explained with reference to FIGS. 9 to 11.

In (1) of <control of electronic zoom>, control of the electronic zoom starts in response to an instruction from the zoom button or zoom lever of an operation unit 9.

In (2) of <control of electronic zoom>, a synchronous control unit 10 detects which of the high- and low-magnification sides is designated with the zoom button or zoom lever of the operation unit 9. The synchronous control unit 10 decides the next electronic zoom stop position from the current one, and switches driving of the image sensing element 2.

First, a case will be described, in which the electronic zoom magnification upon power-on is assumed to be the 1.00× (equal magnification) electronic zoom stop position in FIG. 9 and the operation unit 9 is used to electronically zoom toward the high-magnification side.

If an instruction is input from the operation unit 9 to zoom toward the low-magnification side, no lower electronic zoom magnification can be set, so the synchronous control unit 10 ignores the instruction.

For the 1.00× (equal magnification) electronic zoom, the image sensing element 2 reads out signals from the 1.00× angle 701 of view serving as the full angle of view in FIG. 9 while thinning them at a thinning rate of 1/3. A signal processing unit 5 generates an image of 640×480 pixels in the horizontal and vertical directions using the 1,000×750 readout pixels in the horizontal and vertical directions. The generated image is displayed or recorded, or displayed and recorded.

Since the instruction from the operation unit 9 is to zoom toward the high-magnification side, 800×600 pixels in the horizontal and vertical directions in the 1.25× angle 702 of view are used while the 1.00× angle 701 of view serving as the full angle of view in FIG. 9 is kept set for readout from the image sensing element 2. The signal processing unit 5 generates an image of 640×480 pixels in the horizontal and vertical directions. If the instruction from the operation unit 9 ends, the image generated by continuously reading out signals from the image sensing element 2 is displayed or recorded, or displayed and recorded as a 1.25× electronic zoom image.

If the instruction is kept input from the operation unit 9 to zoom toward the high-magnification side, 720×540 pixels in the horizontal and vertical directions in the 1.39× angle 703 of view are used while the 1.00× angle 701 of view serving as the full angle of view in FIG. 9 is kept set for readout from the image sensing element 2. The signal processing unit 5 generates an image of 640×480 pixels in the horizontal and vertical directions. If the instruction from the operation unit 9 ends, the image generated by continuously reading out signals from the image sensing element 2 is displayed or recorded, or displayed and recorded as a 1.39× electronic zoom image.

If the instruction is kept input from the operation unit 9 to zoom toward the high-magnification side, readout from the image sensing element 2 is switched to the angle of view in FIG. 10, and signals are read out from the 1.39× angle 711 of view while thinning them at a thinning rate of 1/2. The signal processing unit 5 generates an image of 640×480 pixels in the horizontal and vertical directions using 960×720 pixels in the horizontal and vertical directions, which correspond to the 1.56× angle 712 of view, out of the 1,080×810 readout pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 1.56× electronic zoom image.

If the instruction is kept input from the operation unit 9 to zoom toward the high-magnification side, 800×600 pixels in the horizontal and vertical directions in the 1.88× angle 713 of view are used while the 1.39× angle 711 of view in FIG. 10 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 1.88× electronic zoom image.

If the instruction is kept input from the operation unit 9 to zoom toward the high-magnification side, 700×525 pixels in the horizontal and vertical directions in the 2.14× angle 714 of view are used while the 1.39× angle 711 of view in FIG. 10 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 2.14× electronic zoom image.

If the instruction is kept input from the operation unit 9 to zoom toward the high-magnification side, readout from the image sensing element 2 is switched to the angle of view in FIG. 11, and signals are read out from the 2.14× angle 721 of view at a thinning rate of 1/1. The signal processing unit 5 generates an image of 640×480 pixels in the horizontal and vertical directions using 1,280×960 pixels in the horizontal and vertical directions, which correspond to the 2.34× angle 722 of view, out of the 1,400×1,050 readout pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 2.34× electronic zoom image.

If the instruction is kept input from the operation unit 9 to zoom toward the high-magnification side, 1,000×750 pixels in the horizontal and vertical directions in the 3.00× angle 723 of view are used while the 2.14× angle 721 of view in FIG. 11 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 3.00× electronic zoom image.

If the instruction is kept input from the operation unit 9 to zoom toward the high-magnification side, 800×600 pixels in the horizontal and vertical directions in the 3.75× angle 724 of view are used while the 2.14× angle 721 of view in FIG. 11 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 3.75× electronic zoom image.

If the instruction is kept input from the operation unit 9 to zoom toward the high-magnification side, 640×480 pixels in the horizontal and vertical directions in the 4.69× angle 725 of view are used while the 2.14× angle 721 of view in FIG. 11 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 4.69× electronic zoom image.

If the instruction is kept input from the operation unit 9 to zoom toward the high-magnification side, no higher electronic zoom magnification can be set, so the synchronous control unit 10 ignores the instruction.

Next, a case will be described, in which the electronic zoom stop position is assumed to be the 4.69× electronic zoom stop position in FIG. 11 and the operation unit 9 is used to electronically zoom toward the low-magnification side.

The operation at each electronic zoom stop position is the same as that when electronically zooming toward the high-magnification side, and a description thereof will not be repeated.

For the 4.69× to 2.34× electronic zooms, the angle of view changes in order from the 4.69× angle 725 of view to the 2.34× angle 722 of view while keeping the mode in which the image sensing element 2 reads out signals from the 2.14× angle 721 of view in FIG. 11 at a thinning rate of 1/1. The signal processing unit 5 generates an image of 640×480 pixels in the horizontal and vertical directions based on each electronic zoom magnification. The generated image is displayed or recorded, or displayed and recorded.

For the 2.14× electronic zoom, readout from the image sensing element 2 uses 1,400×1,050 pixels in the horizontal and vertical directions read out from the 2.14× angle 721 of view in FIG. 11 at the thinning rate of 1/1. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 2.14× electronic zoom image.

For the 1.88× to 1.56× electronic zooms, readout from the image sensing element 2 is switched to the angle of view in FIG. 10. The angle of view changes in order from the 1.88× angle 713 of view to the 1.56× angle 712 of view while keeping the mode in which signals are read out from the 1.39× angle 711 of view at a thinning rate of 1/2. The signal processing unit 5 generates an image of 640×480 pixels in the horizontal and vertical directions based on each electronic zoom magnification. The generated image is displayed or recorded, or displayed and recorded.

For the 1.39× electronic zoom, readout from the image sensing element 2 uses 1,080×810 pixels in the horizontal and vertical directions read out from the 1.39× angle 711 of view in FIG. 10 at the thinning rate of 1/2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 1.39× electronic zoom image.

For the 1.25× to 1.00× (equal magnification) electronic zooms, readout from the image sensing element 2 is switched to the angle of view in FIG. 9. The angle of view changes in order from the 1.25× angle 702 of view to the 1.00× angle 701 of view while keeping the mode in which signals are read out from the 1.00× angle 701 of view at a thinning rate of 1/3. The signal processing unit 5 generates an image of 640×480 pixels in the horizontal and vertical directions based on each electronic zoom magnification. The generated image is displayed or recorded, or displayed and recorded.

Also when the electronic zoom is done from an intermediate electronic zoom stop position toward the high- or low-magnification side, it starts from an intermediate angle of view as described above in accordance with an instruction from the operation unit 9 to electronically zoom toward the high- or low-magnification side. A description of this operation will be omitted.

It is also possible to set an angle of view smaller than the 4.69× angle 725 of view in FIG. 11, and execute or combine a higher-magnification electronic zoom though the resolution degrades.

As described above, according to the third embodiment, a zoom image is always generated using 640×480 or more pixels in the horizontal and vertical directions which are equal to or higher than the pixel count for movie recording. An electronic zoom almost free from the degradation of resolution can be provided.

While 12 electronic zoom stop positions are set, three readout angles of view suffice for the image sensing element 2. This can reduce the complexity of control of the image sensing element 2.

The 2.14× angle 721 of view serving as the readout angle of view of the image sensing element 2 shown in FIG. 11 is larger in pixel count by one step than the 2.34× angle 722 of view having a pixel count twice as large as the movie recording pixel count of 640×480 pixels in the horizontal and vertical directions.

The 1.39× angle 711 of view serving as the readout angle of view of the image sensing element 2 shown in FIG. 10 is larger in pixel count by one step than the 1.56× angle 712 of view having a pixel count 1.5 times as large as the movie recording pixel count of 640×480 pixels in the horizontal and vertical directions.

In comparison with the pixel count of the 1.00× angle 701 of view serving as the readout angle of view of the image sensing element 2 shown in FIG. 9, the pixel count of the 1.00× angle 701 of view:that of the 1.39× angle 711 of view:that of the 2.14× angle 721 of view
=(1000×750) pixels:(1080×810) pixels:(1400×1050) pixels
=750000 pixels:874800 pixels:1470000 pixels The ratio between the maximum and minimum readout pixel counts falls within 1/2.

This setting can prevent the readout time of a shot image from becoming long within the region when the electronic zoom is executed.

Signals need not always be read out from all pixels, so a decrease in frame rate can be suppressed.

As described above, it is known that the image quality differs between an image generated from an image having the movie recording pixel count without decreasing the pixel count and an image generated from an image having the movie recording pixel count while decreasing the pixel count.

The third embodiment does not utilize modes in which an image is generated from 640×480 pixels in the horizontal and vertical directions, which is the pixel count for movie recording, in the 1.56× angle 704 of view in FIG. 9 and the 2.34× angle 715 of view in FIG. 10. Thus, the same image quality can always be maintained.

Only for the 4.69× angle 725 of view in FIG. 11, an image is generated from 640×480 pixels in the horizontal and vertical directions, which is the pixel count for movie recording. However, the thinning rate has already reached 1/1, and the same image processing method as that for other angles of view cannot expect the effect of maintaining the image quality, unlike the other angles of view.

The third embodiment does not use modes in which an image is generated from 640×480 pixels in the horizontal and vertical directions, which is the pixel count for movie recording, in the 1.56× angle 704 of view in FIG. 9 and the 2.34× angle 715 of view in FIG. 10. Hence, these modes may be omitted.

In the third embodiment, when the electronic zoom is executed toward the high-magnification side, the readout angle of view of the image sensing element 2 is switched between the 1.39× and 1.56× electronic zooms and between the 2.14× and 2.34× electronic zooms. When the electronic zoom is done toward the low-magnification side, the readout angle of view of the image sensing element 2 is switched between the 2.14× and 1.88× electronic zooms and between the 1.39× and 1.25× electronic zooms.

That is, the switching point of the readout angle of view of the image sensing element 2 differs between electronic zooming toward the high-magnification side and that toward the low-magnification side. At any zoom stop position, a change of the angle of view accompanied by switching the readout angle of view of the image sensing element 2 is not frequently repeated. The control rule becomes clear, reducing the burden on the synchronous control unit 10.

[Fourth Embodiment]

The fourth embodiment will be described below with reference to FIGS. 1 to 5 and 9 to 11. The arrangements in FIGS. 1 to 5 are the same as those in the first embodiment, and a description thereof will not be repeated. The operations at respective electronic zoom stop positions in FIGS. 9 to 11 are also the same as those in the third embodiment, and a description thereof will not be repeated.

In the first embodiment, the readout angle of view of the image sensing element 2 is switched between the 1.39× and 1.56× electronic zooms and between the 2.14× and 2.34× electronic zooms along with an operation to change the electronic zoom magnification.

Referring to FIGS. 9 to 11, driving of the image sensing element 2 is switched between the 1.39× angle 703 of view in FIG. 9 and the 1.56× angle 712 of view in FIG. 10 and between the 2.14× angle 714 of view in FIG. 10 and the 2.34× angle 722 of view in FIG. 11.

For example, when an instruction from the operation unit 9 stops between the 1.39× and 1.56× electronic zooms, the synchronous control unit 10 selects either the 1.39× angle 703 of view in FIG. 9 or the 1.56× angle 712 of view in FIG. 10. If the control has not been completed, the image sensing element 2 is frequently switched between the 1.39× angle 703 of view in FIG. 9 and the 1.56× angle 712 of view in FIG. 10.

In this case, the synchronous control unit 10 repetitively executes control to simultaneously switch driving control of the image sensing element 2 and operation control of the signal processing unit 5. This places a heavy burden on the synchronous control unit 10, obstructing control of the optical system 1, the memory 6 for storing an image, the image display unit 7, the image recording unit 8, the operation unit 9, and the like.

The fourth embodiment executes an electronic zoom operation which does not frequently repeat switching of the readout angle of view of an image sensing element 2.

Similar to the third embodiment, in (1) of <control of electronic zoom>, control of the electronic zoom starts in response to an instruction from the zoom button or zoom lever of an operation unit 9.

In (2) of <control of electronic zoom>, a synchronous control unit 10 detects which of the high- and low-magnification sides is designated with the zoom button or zoom lever of the operation unit 9. The synchronous control unit 10 decides the next electronic zoom stop position from the current one, and switches driving of the image sensing element 2.

First, a case will be described, in which the electronic zoom magnification upon power-on is assumed to be the 1.00× (equal magnification) electronic zoom stop position in FIG. 9 and the operation unit 9 is used to electronically zoom toward the high-magnification side.

As for the operation at each electronic zoom stop position, a description of the same operation as that in the third embodiment will not be repeated.

If an instruction is input from the operation unit 9 to zoom toward the low-magnification side, no lower electronic zoom magnification can be set, so the synchronous control unit 10 ignores the instruction.

For the 1.00× (equal magnification) electronic zoom, the image sensing element 2 reads out signals from a 1.00× angle 701 of view serving as the full angle of view in FIG. 9 while thinning them at a thinning rate of 1/3. A signal processing unit 5 generates an image of 640×480 pixels in the horizontal and vertical directions using the 1,000×750 readout pixels in the horizontal and vertical directions. The generated image is displayed or recorded, or displayed and recorded.

For the 1.00× (equal magnification) to 1.39× electronic zooms, the angle of view changes in order from the 1.00× angle 701 of view to a 1.39× angle 703 of view while keeping the mode in which the image sensing element 2 reads out signals from the 1.00× angle 701 of view in FIG. 9 at the 1/3 thinning rate.

The signal processing unit 5 generates an image of 640×480 pixels in the horizontal and vertical directions based on each electronic zoom magnification. The generated image is displayed or recorded, or displayed and recorded.

For the 1.56× electronic zoom, 640×480 pixels in a 1.56× angle 704 of view are used while the 1.00× angle 701 of view serving as the full angle of view in FIG. 9 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 1.56× electronic zoom image.

For the 1.88× to 2.14× electronic zooms, readout from the image sensing element 2 is switched to the angle of view in FIG. 10. The angle of view changes in order from a 1.88× angle 713 of view to a 2.14× angle 714 of view while keeping the mode in which signals are read out from a 1.39× angle 711 of view at a thinning rate of 1/2. The signal processing unit 5 generates an image of 640×480 pixels in the horizontal and vertical directions based on each electronic zoom magnification. The generated image is displayed or recorded, or displayed and recorded.

For the 2.34× electronic zoom, 640×480 pixels in a 2.34× angle 715 of view are used while the 1.39× angle 711 of view in FIG. 10 is kept set for readout from the image sensing element 2. The signal processing unit 5 generates an image of 640×480 pixels in the horizontal and vertical directions. The generated image is displayed or recorded, or displayed and recorded. If the instruction from the operation unit 9 ends, the image generated by continuously reading out signals from the image sensing element 2 is kept displayed or recorded, or displayed and recorded as a 2.34× electronic zoom image.

For the 3.00× to 4.69× electronic zooms, readout from the image sensing element 2 is switched to the angle of view in FIG. 11. The angle of view changes in order from a 3.00× angle 723 of view to a 4.69× angle 725 of view while keeping the mode in which signals are read out from the 2.14× angle 714 of view at a thinning rate of 1/1. The signal processing unit 5 generates an image of 640×480 pixels in the horizontal and vertical directions based on each electronic zoom magnification. The generated image is displayed or recorded, or displayed and recorded.

If the instruction is kept input from the operation unit 9 to zoom toward the high-magnification side, no higher electronic zoom magnification can be set, so the synchronous control unit 10 ignores the instruction.

Next, a case will be described, in which the electronic zoom stop position is assumed to be the 4.69× electronic zoom stop position in FIG. 11 and the operation unit 9 is used to electronically zoom toward the low-magnification side.

As for the operation at each electronic zoom stop position, a description of the same operation as that in the third embodiment will not be repeated.

For the 4.69× to 2.14× electronic zooms, the angle of view changes in order from the 4.69× angle 725 of view to a 2.14× angle 721 of view while keeping the mode in which the image sensing element 2 reads out signals from the 2.14× angle 721 of view in FIG. 11 at a thinning rate of 1/1. The signal processing unit 5 generates an image of 640×480 pixels in the horizontal and vertical directions based on each electronic zoom magnification. The generated image is displayed or recorded, or displayed and recorded.

For the 1.88× to 1.39× electronic zooms, readout from the image sensing element 2 is switched to the angle of view in FIG. 10. The angle of view changes in order from the 1.88× angle 713 of view to the 1.39× angle 711 of view while keeping the mode in which signals are read out from the 1.39× angle 711 of view at a thinning rate of 1/2. The signal processing unit 5 generates an image of 640×480 pixels in the horizontal and vertical directions based on each electronic zoom magnification. The generated image is displayed or recorded, or displayed and recorded.

For the 1.25× to 1.00× (equal magnification) electronic zooms, readout from the image sensing element 2 is switched to the angle of view in FIG. 9. The angle of view changes in order from a 1.25× angle 702 of view to the 1.00× angle 701 of view while keeping the mode in which signals are read out from the 1.00× angle 701 of view at a thinning rate of 1/3. The signal processing unit 5 generates an image of 640×480 pixels in the horizontal and vertical directions based on each electronic zoom magnification. The generated image is displayed or recorded, or displayed and recorded.

Also when the electronic zoom is done from an intermediate electronic zoom stop position toward the high- or low-magnification side, it starts from an intermediate angle of view as described above in accordance with an instruction from the operation unit 9 to electronically zoom toward the high- or low-magnification side. A description of this operation will be omitted.

As described above, according to the fourth embodiment, a zoom image is always generated using 640×480 or more pixels in the horizontal and vertical directions which are equal to or higher than the pixel count for movie recording. An electronic zoom almost free from the degradation of resolution can be achieved.

While 14 electronic zoom stop positions are set, three readout angles of view suffice for the image sensing element 2. This can reduce the complexity of control of the image sensing element.

The 2.14× angle 721 of view serving as the readout angle of view of the image sensing element 2 shown in FIG. 11 is larger in pixel count by one step than the 2.34× angle 722 of view having a pixel count twice as large as the movie recording pixel count of 640×480 pixels in the horizontal and vertical directions.

The 1.39× angle 711 of view serving as the readout angle of view of the image sensing element 2 shown in FIG. 10 is larger in pixel count by one step than the 1.56× angle 712 of view having a pixel count 1.5 times as large as the movie recording pixel count of 640×480 pixels in the horizontal and vertical directions.

In comparison with the pixel count of the 1.00× angle 701 of view serving as the readout angle of view of the image sensing element 2 shown in FIG. 9, the pixel count of the 1.00× angle 701 of view:that of the 1.39× angle 711 of view:that of the 2.14× angle 721 of view
=(1000×750) pixels:(1080×810) pixels:(1400×1050) pixels
=750000 pixels:874800 pixels:147000 pixels The ratio between the maximum and minimum readout pixel counts falls within 1/2.

This setting can prevent the readout time of a shot image from becoming long within the region when the electronic zoom is executed.

Signals need not always be read out from all pixels, so a decrease in frame rate can be suppressed.

In the fourth embodiment, when the electronic zoom is executed toward the high-magnification side, the readout angle of view of the image sensing element 2 is switched between the 1.56× and 1.88× electronic zooms and between the 2.34× and 3.00× electronic zooms. When the electronic zoom is done toward the low-magnification side, the readout angle of view of the image sensing element 2 is switched between the 2.14× and 1.88× electronic zooms and between the 1.39× and 1.25× electronic zooms.

That is, the switching point of the readout angle of view of the image sensing element 2 differs between electronic zooming toward the high-magnification side and that toward the low-magnification side. At any zoom stop position, a change of the angle of view accompanied by switching the readout angle of view of the image sensing element 2 is not frequently repeated. The control rule becomes clear, reducing the burden on the synchronous control unit 10.

In actual shooting, electronic zooming toward the high-magnification side and that toward the low-magnification side are sometimes repeated to decide the shooting angle of view while operating the electronic zoom using the zoom button or zoom lever of the operation unit 9.

In this case, if a zoom stop position serving as a switching point of the readout angle of view of the image sensing element 2 shifts by only one point, like the second and third embodiments, the readout angle of view of the image sensing element 2 may be switched frequently.

To prevent this, the fourth embodiment controls to switch by a shift of two points a zoom stop position serving as a switching point of the readout angle of view of the image sensing element 2. Even when electronic zooming toward the high-magnification side and that toward the low-magnification side are repetitively executed, the probability at which the readout angle of view of the image sensing element 2 is switched can be decreased, reducing the burden on the synchronous control unit 10.

The 2.14× angle 721 of view in FIG. 11 is larger by one step than the 2.34× angle 722 of view having a pixel count twice as large as the movie recording pixel count in the horizontal and vertical directions. The 1.39× angle 711 of view in FIG. 10 is larger by one step than the 1.56× angle 712 of view having a pixel count 1.5 times as large as the movie recording pixel count in the horizontal and vertical directions.

The readout angle of view of the image sensing element 2 shown in FIG. 11 may be changed to an angle of view corresponding to the 1.88× angle 713 of view larger by one more step. Also, the readout angle of view of the image sensing element 2 shown in FIG. 10 may be changed to an angle of view corresponding to the 1.25× angle 702 of view larger by one more step.

These settings enable control to shift by two points a zoom stop position serving as a switching point of the readout angle of view of the image sensing element 2 while obviating the need to use a mode in which an image is formed from 640×480 pixels in the horizontal and vertical directions, which is the pixel count for movie recording.

The maximum readout angle of view of the image sensing element 2 suffices to be determined in consideration of the trade-off between the ease of control of the electronic zoom, and the frame rate in shooting, the limitation on the readout pixel count, or the like.

It is also possible to set an angle of view smaller than the 4.69× angle 725 of view in FIG. 11, and execute or combine a higher-magnification electronic zoom though the resolution degrades.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-223916, filed Sep. 1, 2008 which is hereby incorporated by reference herein in its entirety.

What is claimed is:

1. An image sensing apparatus comprising:
   an image sensing element having a plurality of pixels each of which performs a photo-electric conversion of an object image;
   a readout unit configured to read out pixel signals from said image sensing element;
   a generating unit configured to generate an image having a predetermined pixel count by using the pixel signal read out by said readout unit; and
   a control unit configured to control said readout unit to read out pixel signals from partial pixel regions of said image sensing element corresponding to a predetermined angle of view at a predetermined thinning rate, to control said generating unit to extract pixel signals at an angle of view which is smaller than the predetermined angle of view from pixel signals read out at the predetermined angle of view, and to control said generating unit to generate the image having the predetermined pixel count by reducing a pixel count from the extracted pixel signals,
   wherein when n is a natural number, the predetermined thinning rate is be set to 1/n in each of horizontal and vertical directions of said image sensing element.

2. The apparatus according to claim 1, further comprising a setting unit configured to set a zoom magnification of an electronic zoom,
   wherein said control unit controls said generating unit to extract pixel signals at the angle of view which is smaller than the predetermined angle of view from pixel signals read out at the predetermined angle of view based on the zoom magnification set by said setting unit.

3. A method of controlling an image sensing apparatus having an image sensing element having a plurality of pixels each of which performs a photo-electric conversion of an object image, the method comprising:
   a readout step of reading out pixel signals from said image sensing element;
   a generating step of generating an image having a predetermined pixel count by using the pixel signal read out by said readout step; and
   a control step of controlling in said readout step to read out pixel signals from partial pixel regions of said image sensing element corresponding to a predetermined angle of view at a predetermined thinning rate, controlling in said generating step to extract pixel signals at an angle of view which is smaller than the predetermined angle of view from pixel signals read out at the predetermined angle of view, and controlling in said generating step to generate the image having the predetermined pixel count by reducing a pixel count from the extracted pixel signals,
   wherein when n is a natural number, the predetermined thinning rate is be set to 1/n in each of horizontal and vertical directions of said image sensing element.

4. The method according to claim 3, wherein said image sensing apparatus further comprises a setting unit configured to set a zoom magnification of an electronic zoom,
   wherein control in said generating step is performed to extract pixel signals at the angle of view which is smaller than the predetermined angle of view from pixel signals read out at the predetermined angle of view based on the zoom magnification set by said setting unit.

* * * * *